(12) United States Patent
Zeng et al.

(10) Patent No.: US 12,323,992 B2
(45) Date of Patent: Jun. 3, 2025

(54) HARQ-ACK CODEBOOK GENERATION METHOD, INFORMATION TRANSMITTING METHOD, AND DEVICE

(71) Applicant: VIVO MOBILE COMMUNICATION CO., LTD., Guangdong (CN)

(72) Inventors: Chaojun Zeng, Guangdong (CN); Na Li, Guangdong (CN); Gen Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 407 days.

(21) Appl. No.: 17/732,356

(22) Filed: Apr. 28, 2022

(65) Prior Publication Data

US 2022/0256586 A1    Aug. 11, 2022

Related U.S. Application Data

(63) Continuation of application No. PCT/CN2020/125771, filed on Nov. 2, 2020.

(30) Foreign Application Priority Data

Nov. 7, 2019    (CN) .......................... 201911083905.9

(51) Int. Cl.
*H04W 72/23*    (2023.01)
*H04L 1/1607*    (2023.01)
(Continued)

(52) U.S. Cl.
CPC ........... *H04W 72/23* (2023.01); *H04L 1/1607* (2013.01); *H04L 1/1812* (2013.01);
(Continued)

(58) Field of Classification Search
CPC .... H04W 72/23; H04L 1/1812; H04L 5/0055; H04L 1/1854; H04L 1/1861; H04L 1/1896; H04L 1/1607
See application file for complete search history.

(56) References Cited

U.S. PATENT DOCUMENTS

2016/0270060 A1*    9/2016    Kusashima ........... H04W 72/23
2018/0019843 A1    1/2018    Papasakellariou
(Continued)

FOREIGN PATENT DOCUMENTS

CN    109586877 A    4/2019
CN    110351022 A    10/2019
(Continued)

OTHER PUBLICATIONS

First Office Action for Indian Application No. 202227030664, dated Oct. 17, 2022, 5 Pages (including English Translation).
(Continued)

*Primary Examiner* — Kwang B Yao
*Assistant Examiner* — Bradley D Lytle, Jr.
(74) *Attorney, Agent, or Firm* — BROOKS KUSHMAN P.C.

(57) ABSTRACT

A HARQ-ACK codebook generation method, an information transmitting method, a terminal, and a network-side device are provided. The method includes: receiving first downlink control information DCI used for scheduling a first physical uplink shared channel PUSCH, where the first DCI
(Continued)

Receive first downlink control information DCI used for scheduling a first physical uplink shared channel PUSCH, where the first DCI includes a first DAI — 201

Determine, based on the first DAI, a second DAI corresponding to each of N physical downlink shared channel PDSCH groups, where N is a positive integer — 202

Generate, based on the determined N second DAIs, a dynamic codebook to be transmitted on the first PUSCH, where the dynamic codebook includes HARQ-ACK bit sequences of the N PDSCH groups — 203 includes a first DAI; determining, based on the first DAI, a second DAI corresponding to each of N physical downlink shared channel PDSCH groups; and generating, based on the determined N second DAIs, a dynamic codebook to be transmitted on the first PUSCH, where the dynamic codebook includes HARQ-ACK bit sequences of the N PDSCH groups, and N is a positive integer.

20 Claims, 4 Drawing Sheets

(51) Int. Cl.
  *H04L 1/1812* (2023.01)
  *H04L 1/1829* (2023.01)
  *H04L 1/1867* (2023.01)
  *H04L 5/00* (2006.01)

(52) U.S. Cl.
  CPC .......... *H04L 1/1854* (2013.01); *H04L 1/1861* (2013.01); *H04L 1/1896* (2013.01); *H04L 5/0055* (2013.01)

(56) References Cited

U.S. PATENT DOCUMENTS

| | | |
|---|---|---|
| 2018/0175969 A1 | 6/2018 | Guan et al. |
| 2019/0103943 A1* | 4/2019 | Wang .................... H04L 1/1854 |
| 2020/0022098 A1* | 1/2020 | Takeda .................. H04L 1/1854 |
| 2020/0295882 A1* | 9/2020 | Wang .................... H04L 5/0055 |
| 2020/0358487 A1 | 11/2020 | Yang et al. |

FOREIGN PATENT DOCUMENTS

| | | |
|---|---|---|
| CN | 111277388 A | 6/2020 |
| JP | 2018530202 A | 10/2018 |
| WO | 2019050368 A1 | 3/2019 |
| WO | 2019066630 A1 | 4/2019 |

OTHER PUBLICATIONS

Extended European Search Report for Application No. 20885427.3-1213, dated Nov. 29, 2022, 11 Pages.
3GPP, "3rd Generation Partnership Project; Technical Specification Group Radio Access Network; 5GS; User Equipment (UE) Conformance Specification; Part 3: Protocol Test Suites (Release 15)," 3GPP TS 38.523-3, Sep. 2019, V15.5.0, 214 Pages.
International Search Report and Written Opinion for Application No. PCT/CN2020/125771, dated Feb. 3, 2021, 8 Pages.
Huawei, "Feature Lead Summary of HARQ Enhancements for NR-U," 3GPP TSG RAN WG1 #97, Agenda item 7.2.2.2.3, May 13-17, 2019, R1-1907652, Reno, NV, USA, 22 Pages.
Nokia et al., "Remaining Issues on NR-U HARQ Scheduling and Feedback," 3GPP TSG RAN WG1 #98bis, Agenda item 7.2.2.2.3, Oct. 14-20, 2019, R1-1910596, Chongqing, China, 16 Pages.
First Office Action for Singapore Application No. 11202204485Q, dated Mar. 14, 2024, 10 Pages.
Ericsson HARQ and scheduling enhancements for NR-U 3GPP TSG-RAN WG1 Meeting #98 Bis, Chongqing, China, Oct. 2019, R1-1910949, 18 Pages.
First Office Action for Korean Application No. 10-2022-7016700, dated Oct. 18, 2024, 5 Pages.
Huawei, HiSilicon "Summary of remaining issues on HARQ management" 3GPP TSG RAN WG1 Meeting Ad Hoc, Vancouver, Canada, Jan. 2018, R1-1800036, 13 Pages.
NTT Docomo, Inc. "HARQ enhancement for NR-U" 3GPP TSG RAN WG1 #97, Reno, USA, May 2019, R1-1906199, 8 Pages.
Third Office Action for Japanese Application No. 2022-524653, dated Jul. 23, 2024, 4 Pages.

* cited by examiner

HARQ-ACK CODEBOOK GENERATION METHOD, INFORMATION TRANSMITTING METHOD, AND DEVICE

CROSS-REFERENCE TO RELATED APPLICATIONS

This application is a continuation of International Application No. PCT/CN2020/125771 filed on Nov. 2, 2020, which claims priority to Chinese Patent Application No. 201911083905.9, filed on Nov. 7, 2019, which are incorporated herein by reference in their entireties.

TECHNICAL FIELD

Embodiments of this application relate to the field of communications technologies, and in particular, to a HARQ-ACK codebook generation method, an information transmitting method, a terminal, and a network-side device.

BACKGROUND

When a UE organizes a HARQ-ACK bit sequence that needs to be reported at a specific feedback occasion, the UE determines a correspondence between each physical downlink shared channel (PDSCH) transmission and one or more bits in the organized HARQ-ACK bit sequence according to predefined rule(s) and based on scheduled PDSCH transmission(s) on one or more carriers, for each of which the corresponding HARQ-ACK needs to be reported at the feedback occasion. This operation is referred to as constructing a HARQ-ACK codebook. HARQ-ACK codebooks include semi-static codebooks and dynamic codebooks.

A HARQ-ACK codebook is usually conveyed by a PUCCH transmission. However, when the PUCCH transmission overlaps with a PUSCH transmission in time domain, some or all of UCI carried on the PUCCH transmission is multiplexed in the PUSCH transmission. A DAI corresponding to the HARQ-ACK codebook multiplexed in a scheduled PUSCH transmission can be indicated in a DCI format 0_1 used for scheduling the PUSCH transmission. The DAI can be regarded as an UL DAI.

Currently, a terminal may be configured to perform HARQ-ACK reporting for a maximum of two PDSCH groups by using one dynamic codebook. However, when an uplink DCI format 0_1 includes only one UL DAI or one group of UL DAIs, there is no corresponding solution currently for how the UL DAI is used for generating a dynamic codebook.

SUMMARY

Embodiments of this application provide a HARQ-ACK codebook generation method, an information transmitting method, a terminal, and a network-side device.

According to a first aspect, an embodiment of this application provides a HARQ-ACK codebook generation method, where the method includes:
   receiving first downlink control information DCI used for scheduling a first physical uplink shared channel PUSCH, where the first DCI includes a first DAI;
   determining, based on the first DAI, a second DAI corresponding to each of N physical downlink shared channel PDSCH groups; and
   generating, based on the determined N second DAIs, a dynamic codebook to be transmitted on the first PUSCH, where
   the dynamic codebook includes HARQ-ACK bit sequences of the N PDSCH groups, and N is a positive integer.

According to a second aspect, an embodiment of this application provides an information transmitting method, where the method includes:
   transmitting first downlink control information DCI used for scheduling a first physical uplink shared channel PUSCH, where the first DCI includes a first DAI, and the first DAI is used for generating a dynamic codebook to be transmitted on the first PUSCH, where
   the dynamic codebook includes HARQ-ACK bit sequences of N physical downlink shared channel PDSCH groups, and N is a positive integer.

According to a third aspect, an embodiment of this application further provides a terminal, where the terminal includes:
   a receiving module, configured to receive first downlink control information DCI used for scheduling a first physical uplink shared channel PUSCH, where the first DCI includes a first DAI;
   a determining module, configured to determine, based on the first DAI, a second DAI corresponding to each of N physical downlink shared channel PDSCH groups; and
   a generation module, configured to generate, based on the determined N second DAIs, a dynamic codebook to be transmitted on the first PUSCH, where
   the dynamic codebook includes HARQ-ACK bit sequences of the N PDSCH groups, and N is a positive integer.

According to a fourth aspect, an embodiment of this application further provides a network-side device, where the network-side device includes:
   a transmitting module, configured to transmit first downlink control information DCI used for scheduling a first physical uplink shared channel PUSCH, where the first DCI includes a first DAI, and the first DAI is used for generating a dynamic codebook to be transmitted on the first PUSCH, where
   the dynamic codebook includes HARQ-ACK bit sequences of N physical downlink shared channel PDSCH groups, and N is a positive integer.

According to a fifth aspect, an embodiment of this application further provides a terminal, where the terminal includes a processor, a memory, and a computer program stored in the memory and capable of running on the processor, and when the computer program is executed by the processor, the steps of the foregoing HARQ-ACK codebook generation method are implemented.

According to a sixth aspect, an embodiment of this application further provides a network-side device, where the network-side device includes a processor, a memory, and a computer program stored in the memory and capable of running on the processor, and when the computer program is executed by the processor, the steps of the foregoing information transmitting method are implemented.

According to a seventh aspect, an embodiment of this application further provides a computer-readable storage medium, where the computer-readable storage medium stores a computer program, and when the computer program is executed by a processor, the steps of the foregoing HARQ-ACK codebook generation method applied to the terminal or the steps of the foregoing information transmitting method applied to the network-side device are implemented.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may derive other drawings from these accompanying drawings without creative efforts.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this application are used to distinguish between similar objects instead of describing a specific order or sequence. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, the use of "and/or" in this application represents presence of at least one of the connected objects. For example, A and/or B and/or C represents the following seven cases: A alone, B alone, C alone, both A and B, both B and C, both A and C, and all of A, B, and C.

Figure 1:
FIG. 1 is a structural diagram of a network system to which an embodiment of this application may be applied.

FIG. 1 is a structural diagram of a network system to which an embodiment of this application may be applied. As shown in FIG. 1, the network system includes a terminal 11 and a network-side device 12, and communication can be performed between the terminal 11 and the network-side device 12.

In this embodiment of this application, the terminal 11 may also be referred to as user equipment (UE). In actual application, the terminal 11 may be a mobile phone, a tablet personal computer, a laptop computer, a personal digital assistant (PDA), a mobile Internet device (MID), a wearable device, a vehicle-mounted device, or the like. The network-side device 12 may be a base station, a relay, an access point, or the like. Further, the base station may be a 5G base station (gNB), a base station in another communications system (for example, an evolved NodeB (Evolved NodeB, eNB)), or the like.

For ease of understanding, the following describes some content included in the embodiments of this application.

1. New Radio (NR) Dynamic Hybrid Automatic Repeat Request Acknowledgement (HARQ-ACK) Codebook When UE organizes a HARQ-ACK bit sequence that needs to be reported at a specific feedback occasion, the UE determines a correspondence between each physical downlink shared channel (PDSCH) transmission and one or more bits in the organized HARQ-ACK bit sequence according to a predefined rule and based on a scheduling status of PDSCH transmission on one or more carriers on which a HARQ-ACK needs to be reported at the feedback occasion. This operation is referred to as construction of a HARQ-ACK codebook.

When downlink control information (DCI) format indicates semi-persistent scheduling (SPS) PDSCH release, the UE also needs to report a HARQ-ACK bit to acknowledge reception of the DCI format, to ensure that both the network and the UE keep consistent understanding on whether the indicated SPS configuration is released or not.

HARQ-ACK codebooks include a semi-static codebook (Type-1) and a dynamic codebook (Type-2). The semi-static codebook is used for performing feedbacks for all possible DCI indication and PDSCH transmission, and mainly used for ensuring transmission reliability, causing relatively large feedback overheads. The dynamic codebook is used for performing feedbacks for only actual DCI indication and PDSCH transmission, causing relatively small feedback overheads, and when missed detection of DCI is relatively common, transmission reliability is affected to some extent.

The dynamic codebook reserves a HARQ-ACK feedback bit for each actually used downlink assignment index (DAI) value by counting a DAI for actually scheduled PDSCH transmission or SPS PDSCH release indication.

If the UE deduces, from other detected DAIs, that PDSCH allocation indications or SPS PDSCH release indications corresponding to some DAIs are not received, the UE sets a corresponding feedback bit to a NACK; otherwise, the UE sets, based on a decoding result of PDSCH transmission corresponding to each PDSCH allocation indication, a HARQ-ACK feedback bit corresponding to the PDSCH allocation indication; and sets, to an ACK, a feedback bit corresponding to a detected SPS PDSCH release indication.

A limited number of bits are used to indicate a DAI (one DAI usually occupies two bits). To extend an indication range of the DAI, a modulo operation is introduced. To be specific, sequentially counting starting from 1 is performed first, and then a DAI value corresponding to a specific count value is obtained through the modulo operation. For DAI processing in downlink scheduling, refer to the following table.

Value of a counter DAI in a DCI format 1_0, and value of a counter DAI or a total DAI in a DCI format 1_1

| DAI MSB, DAI LSB | $V_{C\text{-}DAI}^{DL}$ or $V_{T\text{-}DAI}^{DL}$ | Corresponding Y |
|---|---|---|
| 0, 0 | 1 | $(Y - 1) \bmod 4 + 1 = 1$ |
| 0, 1 | 2 | $(Y - 1) \bmod 4 + 1 = 2$ |
| 1, 0 | 3 | $(Y - 1) \bmod 4 + 1 = 3$ |
| 1, 1 | 4 | $(Y - 1) \bmod 4 + 1 = 4$ |

The foregoing table shows a most significant bit (MSB), a least significant bit (LSB), a counter DAI (C-DAI), and a total DAI (T-DAI).

Y is the number of {serving cell, PDCCH monitoring occasion} pairs in which PDSCH transmission corresponding to a PDCCH or a PDCCH indicating SPS PDSCH release is present (Number of {serving cell, PDCCH monitoring occasion}-pair(s) in which PDSCH transmission(s) associated with PDCCH or PDCCH indicating SPS PDSCH release is present, denoted as Y), and Y≥1.

When the UE is configured with one serving cell, the foregoing DAI counts DCI indications one by one in chronological order only for one carrier, and may be referred to as a C-DAI.

When the UE is configured with a plurality of serving cells, to further improve reliability, the T-DAI is introduced, and is used for indicating the number of all DCI indications received at a current time-domain detection location, including all DCI indications received in all serving cells at the current time-domain detection location. Therefore, a value of the T-DAI is updated only when the time-domain detection location changes.

The T-DAI can be used in combination with the C-DAI to effectively avoid a case that the UE and a gNB have inconsistent understanding on transmission of a DCI indication when the DCI indication in one or more serving cells is lost at a specific time-domain detection location (provided that no DCI indications in all serving cells are lost).

In this embodiment of this application, the following describes a manner of determining a HARQ-ACK bit sequence corresponding to each DAI.

First case: When the network-side device has configured a PDSCH-Code BlockGroupTransmission parameter for a serving cell of the UE to enable code block group (CBG)-based HARQ transmission:

Manner 1: PDSCH transmission scheduled in the DCI format 1_1 supports CBG-based HARQ transmission, and one DAI corresponds to $N_{HARQ\text{-}ACK,max}^{CGB/TB,max}$ HARQ-ACK feedback bits.

$N_{HARQ\text{-}ACK,max}^{CGB/TB,max}$ is a maximum value of $N_{TB,c}^{DL} \cdot N_{HARQ\text{-}ACK,max}^{CGB/TB,max}$ values of $N_{cells}^{DL,CBG}$ serving cells configured with the PDSCH-CodeBlockGroup-Transmission parameter. $N_{TB,c}^{DL}$ is a value of a maxNrofCodeWordsScheduledByDCI parameter of a serving cell c, and indicates the maximum number of transport blocks that can be simultaneously scheduled by one piece of DCI. $N_{HARQ\text{-}ACK,c}^{CGB/TB,max}$ is a value of a maxCodeBlock-GroupsPerTransportBlock parameter of the serving cell c, and indicates the maximum number of CBGs into which one transport block can be split.

If $N_{TB,c}^{DL} \cdot N_{HARQ\text{-}ACK,c}^{CGB/TB,max} <  N_{HARQ\text{-}ACK,max}^{CGB/TB,max}$ for the serving cell c, the UE sets the last $N_{HARQ\text{-}ACK,max}^{CGB/TB,max} - N_{TB,c}^{DL} \cdot N_{HARQ\text{-}ACK,c}^{CGB/TB,max}$ bits of $N_{HARQ\text{-}ACK,max}^{CGB/TB,max}$ bits to a NACK.

The first $N_{TB,c}^{DL} \cdot N_{HARQ\text{-}ACK,c}^{CGB/TB,max}$ bits are set based on a decoding status of each CBG corresponding to an actually received transport block.

Manner 2: PDSCH transmission scheduled in the DCI format 1_0 supports only transport block (TB)-based HARQ transmission, and like SPS PDSCH release indication or SPS PDSCH reception, only one HARQ-ACK bit is fed back for one transport block. All these cases belong to a case that single DCI indication or PDSCH transmission corresponds to only one transport block.

Second case: When the network-side device has not configured the PDSCH-CodeBlockGroupTransmission parameter for a serving cell of the UE, which means that CBG-based HARQ transmission has not been enabled:

Manner 1: If a HARQ-ACK-SpatialBundlingPUCCH or HARQ-ACK-SpatialBundlingPUSCH parameter is not configured for the UE (to be specific, spatial bundling is not enabled for HARQ-ACKs, where the spatial bundling may be understood as compression and combination of HARQ-ACK feedbacks for two codewords corresponding to one PDSCH transmission, the HARQ-ACK-SpatialBundlingPUCCH parameter is applied to HARQ-ACK transmission carried on a PUCCH, and the HARQ-ACK-SpatialBundling-PUSCH parameter is applied to HARQ-ACK transmission carried on a PUSCH) and that one PDSCH reception corresponds to a maximum of two transport blocks is configured for at least one downlink (DL) bandwidth part (BWP) of at least one serving cell of the UE by using the maxNrofCodeWordsScheduledByDCI parameter, one DAI corresponds to two HARQ-ACK bits, where the first bit indicates the HARQ-ACK for the $1^{st}$ transport block, and the second bit indicates the HARQ-ACK for the $2^{nd}$ transport block.

Manner 2: If the HARQ-ACK-SpatialBundlingPUCCH or HARQ-ACK-SpatialBundlingPUSCH parameter is configured for the UE and that one PDSCH reception corresponds to a maximum of two transport blocks is configured for at least one DL BWP of at least one serving cell of the UE by using the maxNrofCode-WordsScheduledByDCI parameter, one DAI corresponds to one HARQ-ACK bit, and the HARQ-ACK bit is set based on the outcome of logical AND between the HARQ-ACK for the $1^{st}$ transport block and the HARQ-ACK for the $2^{nd}$ transport block.

Manner 3: Otherwise, one DAI corresponds to one HARQ-ACK bit, and the HARQ-ACK bit is set based on the HARQ-ACK for the only transport block. "Otherwise" indicates remaining cases other than the cases listed in Manner 1 and Manner 2. To be specific, neither a correspondence to a maximum of two transport blocks nor a spatial bundling-related parameter is configured. In this case, only one transport block can be scheduled by a downlink scheduling DCI format, and therefore, one DAI corresponds to one HARQ-ACK bit.

When the network-side device configures the PDSCH-Code BlockGroupTransmission parameter for one or more serving cells of the UE to enable CBG-based HARQ transmission, a HARQ-ACK codebook includes two HARQ-ACK sub-codebooks. The $1^{st}$ sub-codebook includes all HARQ-ACK bits at a TB granularity, and relates to SPS PDSCH release indication, SPS PDSCH reception, PDSCH transmission (the PDSCH transmission supports only a HARQ-ACK feedback at a TB granularity) scheduled in the DCI format 1_0 in a serving cell in which CBG-based HARQ transmission is enabled, and PDSCH transmission (the PDSCH transmission definitely supports only a HARQ-ACK feedback at a TB granularity) scheduled in the DCI format 1_0/1_1 in a serving cell in which CBG-based HARQ transmission is not enabled. The $2^{nd}$ sub-codebook includes all HARQ-ACK bits at a CBG granularity, and relates to a HARQ-ACK corresponding to PDSCH transmission scheduled in the DCI format 1_1 in a serving cell in which CBG-based HARQ transmission is enabled. The HARQ-ACK codebook is obtained by sequentially concatenating the $1^{st}$ sub-codebook and the $2^{nd}$ sub-codebook.

The HARQ-ACK codebook is usually transmitted on a PUCCH. Time-domain and frequency-domain information of the PUCCH is indicated in DCI (except for that frequency-domain information of a HARQ-ACK feedback PUCCH for an SPS PDSCH may be configured by a higher layer). When the PUCCH transmission overlaps with PUSCH transmission in time domain, some or all of UCI carried on the PUCCH is multiplexed onto the PUSCH for transmission.

For a dynamic HARQ-ACK codebook, missed detection of DCI affects construction of the HARQ-ACK codebook (including the number of HARQ-ACK bits included in the codebook), and the number of HARQ-ACK bits affects a time-frequency resource occupied by the HARQ-ACK codebook during transmission on a PUSCH in a multiplexing manner, thereby affecting time-frequency demapping and decoding of other data transmission (for example, a UL-SCH) on the PUSCH. To avoid impact caused by inconsistent understanding on the number of HARQ-ACK bits between the UE and the network side, a DAI corresponding to the HARQ-ACK codebook transmitted in the multiplexing manner may be indicated in a DCI format 0_1 for scheduling the PUSCH. The DAI may be an UL DAL. The UL DAI is mainly used by the UE to determine the number of HARQ-ACK bits in the HARQ-ACK codebook, and may be used to determine a missed detection status of DCI corresponding to tail HARQ-ACK bits in the HARQ-ACK codebook. When the HARQ-ACK codebook relates to only a HARQ-ACK feedback at a TB granularity (that is, does not relate to two sub-codebooks), only one UL DAI is indicated in the DCI format 0_1 (indicated by a DCI field "1st downlink assignment index"). For one HARQ-ACK codebook, when the HARQ-ACK codebook relates to both a HARQ-ACK feedback at a TB granularity and a HARQ-ACK feedback at a CBG granularity (that is, the HARQ-ACK codebook is obtained by sequentially concatenating two sub-codebooks), two UL DAIs are indicated in the DCI format 0_1, where the $1^{st}$ UL DAI (indicated by a DCI field "1st downlink assignment index") is applied to the $1^{st}$ sub-codebook, and the $2^{nd}$ UL DAI (indicated by a DCI field "2nd downlink assignment index") is applied to the $2^{nd}$ sub-codebook.

2. NR-U Dynamic HARQ-ACK Codebook Enhancement

Enhancement introduced in a dynamic codebook mainly includes the following aspects:

Dynamically scheduled PDSCHs are explicitly grouped, and in scheduling DCI, a group corresponding to a scheduled PDSCH is indicated, where HARQ-ACK feedbacks corresponding to one PDSCH group are all carried on one PUCCH.

C-DAI or T-DAI counting is performed within one PDSCH group.

A new feedback indicator (NFI) is maintained for each PDSCH group, and indicates, through inversion, whether only a new feedback is to be transmitted or a previous feedback needs to be retransmitted. If the NFI is inverted, it indicates that all feedbacks for the PDSCH group earlier than DCI in which the NFI is inverted are to be discarded, and only the DCI and a subsequent HARQ-ACK feedback for a scheduled PDSCH in the PDSCH group are to be transmitted. If the NFI is not inverted, all HARQ-ACK feedbacks for the PDSCH group since the last NFI inversion need to be transmitted, in other words, all HARQ-ACK feedbacks with the same NFI value are valid. Therefore, for two feedback requests for one PDSCH group, the actual number of HARQ-ACK bits that need to be transmitted may vary.

One piece of DCI may request a HARQ-ACK feedback for one or more PDSCH groups to be transmitted on the same PUCCH. Typically, by default, one piece of downlink scheduling DCI requests a HARQ-ACK feedback for a PDSCH group corresponding to a PDSCH scheduled by the DCI. The DCI may further additionally trigger a HARQ-ACK feedback for another PDSCH group to be transmitted on the PUCCH indicated by the DCI.

The maximum number of PDSCH groups currently supported is 2.

The UE may indicate, by using capability information, whether an enhanced dynamic codebook is supported.

When an enhanced dynamic codebook is configured for the UE, in uplink non-fallback DCI, that is, the DCI format 0_1, whether there is an UL DAI for an additional single PDSCH group can be configured by using radio resource control (RRC) signaling. However, when there is only an UL DAI for one PDSCH group in the DCI format 0_1, in terms of a specific PDSCH group to which the UL DAI is applied, no corresponding solution is currently available.

The following describes a HARQ-ACK codebook generation method in the embodiments of this application.

Figure 2:
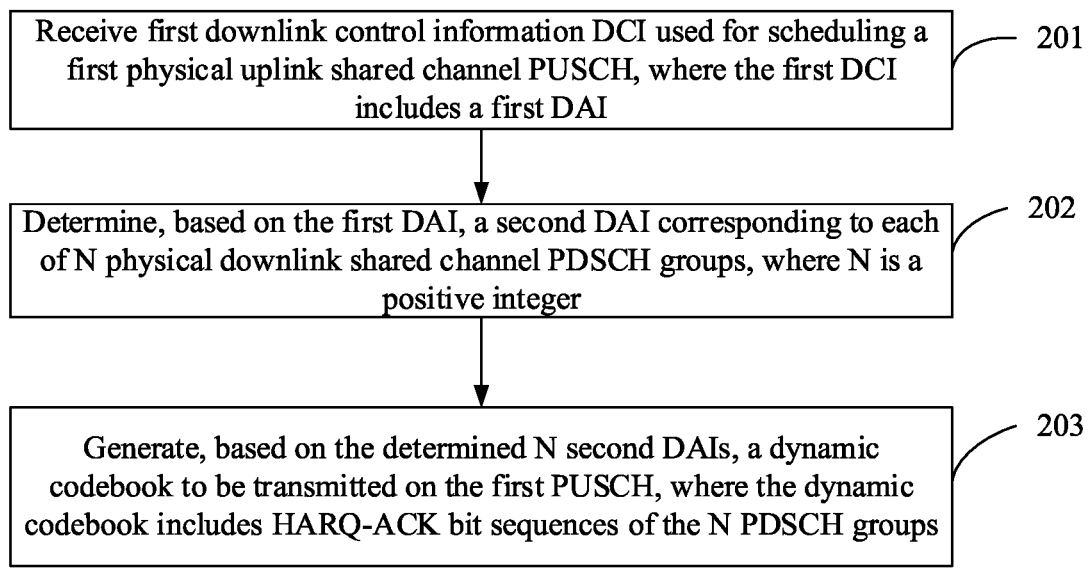
FIG. 2 is a flowchart of a HARQ-ACK codebook generation method according to an embodiment of this application.

FIG. 2 is a flowchart of a HARQ-ACK codebook generation method according to an embodiment of this application. The HARQ-ACK codebook generation method in this embodiment of this application may be applied to a terminal.

As shown in FIG. 2, the HARQ-ACK codebook generation method may include the following steps.

Step 201: Receive first downlink control information DCI used for scheduling a first physical uplink shared channel PUSCH, where the first DCI includes a first DAI.

Step 202: Determine, based on the first DAI, a second DAI corresponding to each of N physical downlink shared channel PDSCH groups, where N is a positive integer.

The second DAI corresponding to each PDSCH group is used for determining a HARQ-ACK bit sequence of the PDSCH group.

Step 203: Generate, based on the determined N second DAIs, a dynamic codebook to be transmitted on the first PUSCH, where the dynamic codebook includes HARQ-ACK bit sequences of the N PDSCH groups.

During specific implementation, the generating, based on the determined N second DAIs, a dynamic codebook to be transmitted on the first PUSCH may specifically include:

determining a HARQ-ACK sequence of each of the N PDSCH groups based on the determined N second DAIs; and generating the dynamic codebook based on the HARQ-ACK sequence of each of the N PDSCH groups.

During specific implementation, optionally, HARQ-ACK sequences of all of the N PDSCH groups may be sequentially concatenated in order of group numbers of the N PDSCH groups, to generate the dynamic codebook. However, this does not constitute a limitation.

According to the HARQ-ACK codebook generation method in this embodiment, after receiving the first downlink control information DCI used for scheduling the first physical uplink shared channel PUSCH, where the first DCI includes the first DAI, the terminal may determine, based on the first DAI, the second DAI corresponding to each of the N physical downlink shared channel PDSCH groups, and further generate, based on the determined N second DAIs, the dynamic codebook to be transmitted on the first PUSCH, where the dynamic codebook includes the HARQ-ACK bit sequences of the N PDSCH groups, and N is a positive integer. It can be learned that this embodiment of this application provides a solution of generating, based on the first DAI, the dynamic codebook including the HARQ-ACK bit sequences of the N PDSCH groups, thereby ensuring transmission reliability of the dynamic codebook.

In this embodiment, optionally, the determining, based on the first DAI, a second DAI corresponding to each of N physical downlink shared channel PDSCH groups includes:
determining a first relationship between the first DAI and the N PDSCH groups; and
determining, based on the first relationship, the second DAI corresponding to each of the N PDSCH groups.

During specific implementation, the determining a first relationship between the first DAI and the N PDSCH groups may include the following two implementations.

Implementation 1: The first relationship satisfies that the first DAI corresponds to at least one of the N PDSCH groups.

In other words, in Implementation 1, the first DAI definitely has a correspondence with at least one of the N PDSCH groups.

In a case that N is equal to 1, that is, the N PDSCH groups include only one PDSCH group, the first DAI corresponds to the PDSCH group.

In a case that N is greater than 1, optionally, the first relationship satisfies any one of the following:
the first DAI corresponds to the N PDSCH groups; or
the first DAI corresponds to the first PDSCH group of the N PDSCH groups.

It should be noted that the first PDSCH group is one of the N PDSCH groups.

During specific implementation, the first PDSCH group may be any one of the N PDSCH groups. Further, the first PDSCH group may satisfy any one of the following:
the first PDSCH group is a PDSCH group to which a PDSCH scheduled by a target DCI format belongs, where the target DCI format is the last one detected by the terminal and is used for scheduling a PDSCH belonging to any of the N PDSCH groups;
the first PDSCH group is prescribed by a protocol; or
the first PDSCH group is configured by a network-side device.

For ease of understanding, the following separately describes various cases.

Case 1: The first PDSCH group satisfies that the first PDSCH group is a PDSCH group to which a PDSCH scheduled by a target DCI format belongs, where the target DCI format is the last one detected by the terminal and is used for scheduling a PDSCH belonging to any of the N PDSCH groups.

In Case 1, the PDSCH group is autonomously determined by the terminal based on a scheduling time of each PDSCH group. Details are described below.

Each PDSCH group includes at least one PDSCH. Each PDSCH corresponds to one piece of DCI used for scheduling the PDSCH for transmission. PDSCH scheduling times at which DCI schedules PDSCHs may be different.

For example, it is assumed that the N PDSCH groups include a PDSCH group 1, a PDSCH group 2, and a PDSCH group 3, and the DCI that is last detected by the terminal and that is used for scheduling a PDSCH in the N PDSCH groups is DCI for scheduling a PDSCH in the PDSCH group 3. Therefore, the PDSCH group 3 may be determined as the first PDSCH group.

Case 2: The first PDSCH group satisfies the condition that the first PDSCH group is prescribed by a protocol.

In Case 2, the first PDSCH group is one of the N PDSCH groups that is prescribed by the protocol.

For example, it may be prescribed by the protocol that the first PDSCH group is the $1^{st}$ PDSCH group or the last PDSCH group of the N PDSCH groups, a PDSCH group with the smallest or largest group number, a PDSCH group corresponding to a HARQ-ACK bit sequence placed at the head or tail of a bit sequence corresponding to the dynamic codebook when the dynamic codebook is generated, or a PDSCH group whose group number is a specified value.

Case 3: The first PDSCH group satisfies the condition that the first PDSCH group is configured by a network-side device.

In Case 3, the first PDSCH group is one of the N PDSCH groups that is configured by the network-side device.

For example, it may be configured by the network-side device that the first PDSCH group is the $1^{st}$ PDSCH group or the last PDSCH group of the N PDSCH groups, a PDSCH group with the smallest or largest group number, a PDSCH group corresponding to a HARQ-ACK bit sequence placed at the head or tail of a bit sequence corresponding to the dynamic codebook when the dynamic codebook is generated, or a PDSCH group whose group number is a specified value.

It can be learned that, compared with Case 1, in Case 2 and Case 3, the terminal does not need to autonomously determine the first PDSCH group, thereby reducing load of the terminal. Compared with Case 2, in Case 1 and Case 3, flexibility of determining the first PDSCH group is higher. Compared with Case 3, in Case 1 and Case 2, the terminal does not need to interact with the network-side device to determine the first PDSCH group, thereby reducing signaling overheads.

Implementation 2: The determining a first relationship between the first DAI and the N PDSCH groups includes:
determining the first relationship between the first DAI and the N PDSCH groups according to a preset rule, where
the preset rule includes at least one of the following:
determining, based on a PDSCH group to which a PDSCH scheduled by a target DCI format belongs, a PDSCH group corresponding to the first DAI, where the target DCI format is the last one detected by the terminal and is used for scheduling a PDSCH belonging to any of the N PDSCH groups;
determining, based on a protocol, a PDSCH group corresponding to the first DAI; or
determining, based on configuration information of a network-side device, a PDSCH group corresponding to the first DAI.

In Implementation 2, optionally, the first relationship satisfies any one of the following:
the first DAI corresponds to the fifth PDSCH group of the N PDSCH groups, where the fifth PDSCH group is any one of the N PDSCH groups; or
the first DAI does not correspond to any one of the N PDSCH groups.

It should be noted that the fifth PDSCH group is similar to the first PDSCH group. For details, refer to the foregoing descriptions of the first PDSCH groups. The details are not described herein again.

It can be learned that, in Implementation 2, in a case that the first relationship between the first DAI and the N PDSCH groups is determined according to the preset rule, the first DAI may not correspond to any one of the N PDSCH groups, in other words, the first DAI is not associated with the N PDSCH groups. Therefore, in Implementation 2, the first DAI does not necessarily have a correspondence with the N PDSCH groups.

It can be learned from the foregoing content that, in this embodiment, the first relationship between the first DAI and the N PDSCH groups includes the following representations.

First representation: The first DAI corresponds to the first PDSCH group of the N PDSCH groups, or the first DAI corresponds to the fifth PDSCH group of the N PDSCH groups.

Second representation: The first DAI corresponds to the N PDSCH groups.

Third representation: The first DAI does not correspond to any one of the N PDSCH groups.

In this embodiment, a specific implementation of the determining, based on the first relationship, the second DAI corresponding to each of the N PDSCH groups is associated with a specific representation of the first relationship between the first DAI and the N PDSCH groups. Therefore, with respect to the foregoing three representations, the following describes specific implementations of the determining, based on the first relationship, the second DAI corresponding to each of the N PDSCH groups.

With Respect to the First Representation

In the case that the first DAI corresponds to the first PDSCH group, optionally, the determining, based on the first relationship, the second DAI corresponding to each of the N PDSCH groups includes:

determining the first DAI as the second DAI corresponding to the first PDSCH group; and determining a third DAI as the second DAI corresponding to the second PDSCH group, where the third DAI is a DAI in DCI that is last detected by the terminal and that corresponds to the second PDSCH group, and the second PDSCH group is any one of the N PDSCH groups other than the first PDSCH group.

For ease of understanding, example descriptions are provided below.

It is assumed that the N PDSCH groups include a PDSCH group 0 and a PDSCH group 1, that the PDSCH group 0 is the first PDSCH group, and that the PDSCH group 1 is the second PDSCH group.

In this case, a second DAI corresponding to the PDSCH group 0 is the first DAI, and a second DAI corresponding to the PDSCH group 1 is a DAI in DCI that is last detected by the terminal and that corresponds to the PDSCH group. Herein, that the DCI corresponds to the PDSCH group means that a PDSCH scheduled by the DCI belongs to the PDSCH group.

In the case that the first DAI corresponds to the fifth PDSCH group of the N PDSCH groups, optionally, the determining, based on the first relationship, the second DAI corresponding to each of the N PDSCH groups includes:

determining the first DAI as the second DAI corresponding to the fifth PDSCH group; and determining an eighth DAI as the second DAI corresponding to the sixth PDSCH group, where the eighth DAI is a DAI in DCI that is last detected by the terminal and that corresponds to the sixth PDSCH group, and the sixth PDSCH group is any one of the N PDSCH groups other than the fifth PDSCH group.

In this case, an implementation principle of the determining, based on the first relationship, the second DAI corresponding to each of the N PDSCH groups is the same as that of the determining, based on the first relationship, the second DAI corresponding to each of the N PDSCH groups in the foregoing case that the first DAI corresponds to the first PDSCH group. For details, reference may be made to the foregoing descriptions, which are not repeated herein.

With Respect to the Second Representation

Optionally, the determining, based on the first relationship, the second DAI corresponding to each of the N PDSCH groups includes:

obtaining a fourth DAI in the second DCI corresponding to each of the N PDSCH groups, where the second DCI corresponding to each PDSCH group is DCI that is last detected by the terminal and that corresponds to the PDSCH group;

comparing a first value with a value of the first DAI to obtain a corresponding comparison result, where the first value is determined based on a sum of values of the obtained N fourth DAIs; and determining, based on the comparison result, the second DAI corresponding to each of the N PDSCH groups.

During specific implementation, in the first implementation, the first value may be a sum of values of the obtained N fourth DAIs.

In the second implementation, the first value may be a value obtained by performing a modulo operation on the sum of the values of the obtained N fourth DAIs. If fourth DAIs corresponding to all of the N PDSCH groups are denoted as $DAI_1, DAI_2, \ldots,$ and $DAI_N$, the first value DAI_Sum may be calculated by using the following formula:

$$DAI\_Sum = (\Sigma_{i=1}^{N} DAI_i - 1) \bmod Round\_Size + 1$$

Round_Size is a modulus of a modulo operation, and is associated with the number L of bits occupied by one DAI. Optionally, Round_Size=2L. For example, when a DAI is indicated by using two bits, Round_Size=4.

In the second representation, the first DAI corresponds to the N PDSCH groups. Therefore, the first DAI corresponds to the sum of the values of the obtained N fourth DAIs. The terminal may compare the first DAI with the first value to obtain the comparison result, and then determine, based on the comparison result, the second DAI corresponding to each of the N PDSCH groups.

The comparison result may be used for determining whether the terminal has missed, in detection, DCI used for scheduling a PDSCH in the N PDSCH groups.

Specifically, if the comparison result is that the first value is equal to the value of the first DAI, the terminal may determine that the terminal has not missed, in detection, DCI used for scheduling a PDSCH in the N PDSCH groups. In a case that no missed detection occurs, the terminal may determine a DAI in DCI that is last detected and that corresponds to each of the N PDSCH groups as the second DAI corresponding to the PDSCH group.

If the comparison result is that the first value is not equal to the value of the first DAI, the terminal may determine that the terminal has missed, in detection, DCI used for scheduling a PDSCH in the N PDSCH groups. In a case that missed detection occurs, the terminal may determine, in the following manner, the second DAI corresponding to each of the N PDSCH groups.

Optionally, the determining, based on the comparison result, the second DAI corresponding to each of the N PDSCH groups includes:

determining a fifth DAI, where the fifth DAI is used for indicating the number of pieces of DCI that is missed in detection and that is used for scheduling a PDSCH in the N PDSCH groups; and determining, based on the fifth DAI, the second DAI corresponding to each of the N PDSCH groups.

During specific implementation, the fifth DAI may be determined based on the first value and the value of the first DAI. The first value is denoted as DAI_Sum, the value of the first DAI is denoted as UL_DAI, and the fifth DAI is denoted as DAI_Diff. Optionally, DAI_Diff may be calculated by using the following formula:

DAI_Diff=(UL_DAI−DAI_Sum−1)mod
    Round_Size+1

X mod Y means X modulo Y, and Round_Size is a modulus of the modulo operation and is associated with the number L of bits occupied by one DAI. Optionally, Round_Size=2L. For example, when a DAI is indicated by using two bits, Round_Size=4. For example, when UL_DAI=3 and DAI_Sum=4, DAI_Diff=(3−4−1)mod 4+1=3.

In this embodiment, a specific implementation of the determining, based on the fifth DAI, the second DAI corresponding to each of the N PDSCH groups is associated with whether the terminal has enabled CBG-based HARQ transmission. In this embodiment, if some serving cells of the terminal are configured with a PDSCH-CodeBlock-GroupTransmission parameter, it may be considered that the terminal has enabled CBG-based HARQ transmission.

The following separately describes Scenario 1 in which the terminal has not enabled CBG-based HARQ transmission, and Scenario 2 in which the terminal has enabled CBG-based HARQ transmission.

In Scenario 1, optionally, the determining, based on the fifth DAI, the second DAI corresponding to each of the N PDSCH groups includes any one of the following:
  in a case that the fifth DAI corresponds to the third PDSCH group of the N PDSCH groups, determining, based on the fifth DAI and a sixth DAI, a second DAI corresponding to the third PDSCH group, and determining a seventh DAI as the second DAI corresponding to the fourth PDSCH group; or
  in a case that the fifth DAI does not correspond to any one of the N PDSCH groups, determining a DAI in DCI that is last detected and that corresponds to each of the N PDSCH groups as the second DAI corresponding to the PDSCH group, where
  the sixth DAI is a DAI in DCI that is last detected by the terminal and that corresponds to the third PDSCH group, the seventh DAI is a DAI in DCI that is last detected by the terminal and that corresponds to the fourth PDSCH group, the third PDSCH group is any one of the N PDSCH groups, and the fourth PDSCH group is any one of the N PDSCH groups other than the third PDSCH group.

It can be learned that, in this embodiment, in Scenario 1, the terminal further needs to determine, based on a second relationship between the fifth DAI and the N PDSCH groups, the second DAI corresponding to each of the N PDSCH groups.

The second relationship is as follows: In a case that the fifth DAI corresponds to the third PDSCH group, the second DAI corresponding to the third PDSCH group is determined based on the fifth DAI and the sixth DAI. Specifically, the second DAI corresponding to the third PDSCH group may be obtained by adding up the fifth DAI and the sixth DAI. Optionally, the second DAI corresponding to the third PDSCH group may be obtained by further performing a modulo operation on a sum obtained through the addition. The second DAI corresponding to the fourth PDSCH group may be a DAI in DCI that is last detected by the terminal and that corresponds to the fourth PDSCH group.

Further, a HARQ-ACK bit sequence of the third PDSCH group includes a first bit sequence and a second bit sequence that are sequentially concatenated, where
  the first bit sequence is determined based on the sixth DAI, and the second bit sequence is determined based on the fifth DAI.

During specific implementation, in the HARQ-ACK bit sequence of the third PDSCH group, the second bit sequence may be located after the first bit sequence.

It should be noted that, in this embodiment, a manner of determining a bit sequence based on a DAI is the same as the "manner of determining a HARQ-ACK bit sequence corresponding to each DAI" in the foregoing part. For details, refer to the foregoing descriptions. Details are not described herein again. It should be noted that, because the dynamic codebook in this embodiment is transmitted on a PUSCH, the HARQ-ACK-SpatialBundlingPUCCH parameter needs to be replaced with the HARQ-ACK-SpatialBundling-PUSCH parameter.

In a case that missed detection occurs on the terminal, a HARQ-ACK codebook of each PDSCH group is determined in the foregoing manner, so that the terminal and the network-side device can understood a size of the dynamic codebook, and the network-side device can further successfully obtain the dynamic codebook, thereby improving reliability of data transmission.

Optionally, the second bit sequence satisfies any one of the following:
  in a case that a first condition is satisfied, the number of bits included in the second bit sequence is twice a value of the fifth DAI, and bits of the second bit sequence are set to a negative acknowledgement NACK; or
  in a case that a first condition is not satisfied, the number of bits included in the second bit sequence is equal to a value of the fifth DAI, and bits of the second bit sequence are set to a NACK, where
  the first condition includes: the terminal has enabled spatial HARQ-ACK bundling indication and one PDSCH reception corresponds to a maximum of two transport blocks.

During specific implementation, if the terminal is not configured with the HARQ-ACK-SpatialBundlingPUSCH parameter, it may be considered that the terminal has enabled spatial HARQ-ACK bundling indication.

That one PDSCH reception corresponds to a maximum of two transport blocks may be configured for at least one DL BWP of at least one serving cell of the terminal by using the maxNrofCodeWordsScheduledByDCI parameter.

In this embodiment, in a case that a bit is set to a negative acknowledgement (NACK), a value of the bit may be set to '0'.

In the case that the second relationship is that the fifth DAI does not correspond to any one of the N PDSCH groups, the second DAI corresponding to each of the N PDSCH groups may be a DAI in DCI that is last detected by the terminal and that corresponds to the PDSCH group.

In Scenario 2, optionally, the determining, based on the fifth DAI, the second DAI corresponding to each of the N PDSCH groups includes any one of the following:
  in a case that the fifth DAI corresponds to the third PDSCH group of the N PDSCH groups, determining, based on a first sub-DAI, a second sub-DAI, a third sub-DAI, and a fourth sub-DAI, the second DAI corresponding to the third PDSCH group, and determining a seventh DAI as the second DAI corresponding to the fourth PDSCH group; or
  in a case that the fifth DAI does not correspond to any one of the N PDSCH groups, determining a DAI in DCI that is last detected and that corresponds to each of the N PDSCH groups as the second DAI corresponding to the PDSCH group, where
  the fifth DAI includes the first sub-DAI corresponding to a transport block TB granularity and the second sub- DAI corresponding to a CBG granularity, the third sub-DAI is a DAI in DCI type 1 that is last detected by the terminal and that corresponds to the third PDSCH group, the fourth sub-DAI is a DAI in DCI type 2 that is last detected by the terminal and that corresponds to the third PDSCH group, the seventh DAI is a DAI in DCI that is last detected by the terminal and that corresponds to the fourth PDSCH group, a PDSCH scheduled by the DCI type 1 feeds back a HARQ-ACK based on the TB granularity, a PDSCH scheduled by the DCI type 2 feeds back a HARQ-ACK based on the CBG granularity, the third PDSCH group is any one of the N PDSCH groups, and the fourth PDSCH group is any one of the N PDSCH groups other than the third PDSCH group.

In Scenario 2, the terminal has enabled CBG-based HARQ transmission. Therefore, DCI used for scheduling a PDSCH in the N PDSCH groups may include DCI type 1 and DCI type 2. A PDSCH scheduled by the DCI type 1 feeds back a HARQ-ACK based on a TB granularity. A PDSCH scheduled by the DCI type 2 feeds back a HARQ-ACK based on a TB granularity.

It can be learned from the foregoing content that the fifth DAI is used for indicating the number of pieces of DCI that is missed in detection and that is used for scheduling a PDSCH in the N PDSCH groups. Therefore, the fifth DAI includes the first sub-DAI corresponding to the transport block TB granularity and the second sub-DAI corresponding to the CBG granularity. The first sub-DAI may be used for indicating the number of pieces of DCI type 1 that is missed in detection and that is used for scheduling a PDSCH in the N PDSCH groups. The second sub-DAI may be used for indicating the number of pieces of DCI type 2 that is missed in detection and that is used for scheduling a PDSCH in the N PDSCH groups.

In Scenario 2, the terminal further needs to determine, based on a second relationship between the fifth DAI and the N PDSCH groups, the second DAI corresponding to each of the N PDSCH groups.

In a case that the second relationship is that the fifth DAI corresponds to the third PDSCH group, the second DAI corresponding to the third PDSCH group is determined based on the first sub-DAI, the second sub-DAI, the third sub-DAI, and the fourth sub-DAI. Specifically, the second DAI corresponding to the third PDSCH group may be obtained by concatenating the first sub-DAI, the second sub-DAI, the third sub-DAI, and the fourth sub-DAI. The second DAI corresponding to the fourth PDSCH group may be a DAI in DCI that is last detected by the terminal and that corresponds to the fourth PDSCH group.

Further, a HARQ-ACK bit sequence of the third PDSCH group includes a third bit sequence, a fourth bit sequence, a fifth bit sequence, and a sixth bit sequence that are sequentially concatenated, where
the third bit sequence is determined based on the third sub-DAI, the fourth bit sequence is determined based on the first sub-DAI, the fifth bit sequence is determined based on the fourth sub-DAI, and the sixth bit sequence is determined based on the second sub-DAI.

During specific implementation, in the HARQ-ACK bit sequence of the third PDSCH group, the third bit sequence and the fourth bit sequence are consecutive, and the fourth bit sequence may be located after the third bit sequence; and the fifth bit sequence and the sixth bit sequence are consecutive, and the sixth bit sequence may be located after the fifth bit sequence. In addition, for a first combined bit sequence of the third bit sequence and the fourth bit sequence and a second combined bit sequence of the fifth bit sequence and the sixth bit sequence, in the HARQ-ACK bit sequence of the third PDSCH group, the first combined bit sequence may be located after the second combined bit sequence, or may be located before the second combined bit sequence. This may be specifically set according to an actual requirement. This is not limited in this embodiment of this application.

In a case that missed detection occurs on the terminal, a HARQ-ACK codebook of each PDSCH group is determined in the foregoing manner, so that the terminal and the network-side device can understood a size of the dynamic codebook, and the network-side device can further successfully obtain the dynamic codebook, thereby improving reliability of data transmission.

Optionally, the fourth bit sequence satisfies any one of the following:
in a case that a first condition is satisfied, the number of bits included in the fourth sequence is twice a value of the first sub-DAI, and bits of the fourth bit sequence are set to a negative acknowledgement NACK; or
in a case that a first condition is not satisfied, the number of bits included in the fourth bit sequence is equal to a value of the first sub-DAI, and bits of the fourth bit sequence are set to a NACK, where
the first condition includes: the terminal has enabled spatial HARQ-ACK bundling indication and one PDSCH reception corresponds to a maximum of two transport blocks.

Optionally, the sixth bit sequence satisfies that:
the number of bits included in the sixth bit sequence is equal to a product of a value of the second sub-DAI and a fourth value, and bits of the sixth bit sequence are set to a NACK, where
the fourth value is determined based on the maximum number of transport blocks that are schedulable by one piece of DCI and the maximum number of CBGs into which one transport block can be split.

During specific implementation, the fourth value may be $N_{HARQ-ACK,max}^{CGB/TB,max}$. For details about a meaning of $N_{HARQ-ACK,max}^{CGB/TB,max}$, refer to the foregoing descriptions. Details are not described herein again.

In the case that the second relationship is that the fifth DAI does not correspond to any one of the N PDSCH groups, the second DAI corresponding to each of the N PDSCH groups may be a DAI in DCI that is last detected by the terminal and that corresponds to the PDSCH group.

In Scenario 1 and Scenario 2, in the case that the fifth DAI does not correspond to any one of the N PDSCH groups, optionally, the generating, based on the determined N second DAIs, a dynamic codebook to be transmitted on the first PUSCH includes:
generating, based on the fifth DAI and the determined N second DAIs, the dynamic codebook to be transmitted on the first PUSCH.

Optionally, the generating, based on the fifth DAI and the determined N second DAIs, the dynamic codebook to be transmitted on the first PUSCH includes:
generating a target bit sequence based on the fifth DAI.

During specific implementation, after generating the target bit sequence based on the fifth DAI, the terminal may add the target bit sequence to the dynamic codebook. To be specific, in this case, the dynamic codebook includes the HARQ-ACK bit sequences of the N PDSCH groups and the target bit sequence.

In this way, the terminal and the network-side device can understand a size of the dynamic codebook, and the network-side device can further successfully obtain the dynamic codebook, thereby improving reliability of data transmission.

During specific implementation, optionally, the target bit sequence may meet any one of the following:

in a case that the terminal has not enabled CBG-based HARQ transmission, the number of bits included in the target bit sequence is equal to a product of a value of the fifth DAI and a second value, and bits of the target bit sequence are set to a NACK; or in a case that the terminal has enabled CBG-based HARQ transmission, the fifth DAI includes the third sub-DAI corresponding to a TB granularity and the fourth sub-DAI corresponding to a CBG granularity, the number of bits included in the target bit sequence is equal to a sum of a first target value and a second target value, the first target value is equal to a product of a value of the third sub-DAI and a second value, the second target value is equal to a product of a value of the fourth sub-DAI and a third value, and bits of the target bit sequence are set to a NACK.

Further, the second value satisfies any one of the following:

in a case that a first condition is satisfied, a value of the second value is 2; or in a case that a first condition is not satisfied, a value of the second value is 1, where the first condition includes: the terminal has enabled spatial HARQ-ACK bundling indication and one PDSCH reception corresponds to a maximum of two transport blocks.

Further, the third value is determined based on the maximum number of transport blocks that are schedulable by one piece of DCI and the maximum number of CBGs into which one transport block can be split.

During specific implementation, the third value may be $N_{HARQ-ACK,max}^{CGB/TB,max}$. For details about a meaning of $N_{HARQ-ACK,max}^{CGB/TB,max}$, refer to the foregoing descriptions. Details are not described herein again.

In Scenario 1 and Scenario 2, optionally, the third PDSCH group satisfies any one of the following:

the third PDSCH group is a PDSCH group to which a PDSCH scheduled by a target DCI format belongs, where the target DCI format is the last one detected by the terminal and is used for scheduling a PDSCH belonging to any of the N PDSCH groups;

the third PDSCH group is prescribed by a protocol; or the third PDSCH group is configured by a network-side device.

With Respect to the Third Representation

Optionally, the determining, based on the first relationship, the second DAI corresponding to each of the N PDSCH groups includes:

determining a DAI in DCI that is last detected and that corresponds to each of the N PDSCH groups as the second DAI corresponding to the PDSCH group.

It should be noted that, in this embodiment, in the first representation, the third representation, and the second representation, in a case that the first value is equal to the value of the first DAI, after the terminal determines the second DAI corresponding to each of the N physical downlink shared channel PDSCH groups, a manner of determining a HARQ-ACK sequence of each of the N PDSCH groups is the same as the "manner of determining a HARQ-ACK bit sequence corresponding to each DAI" in the foregoing part. For details, refer to the foregoing descriptions. Details are not described herein again. It should be noted that, because the dynamic codebook in this embodiment is transmitted on a PUSCH, the HARQ-ACK-SpatialBundlingPUCCH parameter needs to be replaced with the HARQ-ACK-SpatialBundlingPUSCH parameter.

In addition, in this embodiment, in a case that the terminal is configured with only one serving cell, a DAI in DCI that is last detected by the terminal and that corresponds to a PDSCH group is a C-DAI; or in a case that the terminal is configured with two or more serving cells, a DAI in DCI that is last detected by the terminal and that corresponds to a PDSCH group is a T-DAI.

Figure 3:
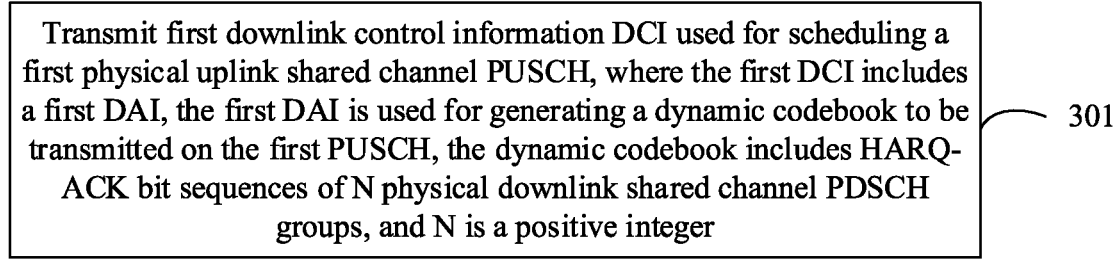
FIG. 3 is a flowchart of an information transmitting method according to an embodiment of this application.

FIG. 3 is a flowchart of an information transmitting method according to an embodiment of this application. The information transmitting method in this embodiment of this application is applied to a network-side device.

As shown in FIG. 3, the information transmitting method may include the following steps.

Step 301: Transmit first downlink control information DCI used for scheduling a first physical uplink shared channel PUSCH, where the first DCI includes a first DAI, the first DAI is used for generating a dynamic codebook to be transmitted on the first PUSCH, the dynamic codebook includes HARQ-ACK bit sequences of N physical downlink shared channel PDSCH groups, and N is a positive integer.

Optionally, the first DAI corresponds to at least one of the N PDSCH groups.

Optionally, in a case that N is greater than 1, the first DAI corresponds to the N PDSCH groups, or the first DAI corresponds to the first PDSCH group of the N PDSCH groups.

Optionally, in a case that the first DAI corresponds to the N PDSCH groups, the first DAI is determined based on a sum of values of N ninth DAIs, where each of the N PDSCH groups corresponds to one ninth DAI, each ninth DAI is carried in third DCI corresponding to a PDSCH group that corresponds to the ninth DAI, and the third DCI corresponding to each PDSCH group is DCI that is last transmitted by the network-side device and that corresponds to the PDSCH group.

During specific implementation, in an implementation, a value of the first DAI may be the sum of the values of the N ninth DAIs. In another implementation, the value of the first DAI may be obtained by performing a modulo operation on the sum of the values of the N ninth DAIs.

Optionally, the first DAI does not correspond to any one of the N PDSCH groups.

In this case, the first DAI may be any set to any value, or may be set to a default value, for example, 4.

According to the information transmitting method in this embodiment, the network-side device transmits the first downlink control information DCI used for scheduling the first physical uplink shared channel PUSCH, where the first DCI includes the first DAI, the first DAI is used for generating the dynamic codebook to be transmitted on the first PUSCH, the dynamic codebook includes the HARQ-ACK bit sequences of the N physical downlink shared channel PDSCH groups, and N is a positive integer. In this way, after receiving the first DAI, a terminal may generate the dynamic codebook based on the first DAI, thereby improving transmission reliability of the dynamic codebook.

It should be noted that this embodiment is an implementation of the network-side device corresponding to the foregoing method embodiments. Therefore, reference can be made to the related descriptions in the foregoing method embodiments, and the same beneficial effects can be achieved. To avoid repetition, details are not described herein again.

In addition, optional implementations described in this embodiment of this application may be implemented in combination or may be implemented independently. This is not limited in this embodiment of this application.

For ease of understanding, example descriptions are provided below.

In this embodiment of this application, when a downlink enhanced dynamic codebook is configured for the UE and there is only one UL DAI or one group of UL DAIs in an uplink DCI format 0_1, one of the following solutions may be used for a meaning and application of the UL DAI.

Solution 1: Determine the meaning of an UL DAI value in the DCI format 0_1 (that is, a value of a "1st downlink assignment index" field and/or a "2nd downlink assignment index" field in the DCI format 0_1) based on the number of triggered PDSCH groups involved in an enhanced dynamic codebook, which overlaps, in time domain, with a PUSCH scheduled by the DCI format 0_1, and is expected to be multiplexed in the PUSCH. The following operations may be used:

When the enhanced dynamic codebook corresponds to only one triggered PDSCH group, the UL DAI value corresponds to the one triggered PDSCH group. A corresponding HARQ-ACK bit may be determined by using an operation 2. Refer to the following descriptions.

When the enhanced dynamic codebook corresponds to more than one triggered PDSCH group, one of the following manners is used:

The UL DAI value corresponds to a sum of DAIs of all triggered PDSCH groups (a modulo operation is also considered), or the number of dynamic scheduling PDSCH receptions/SPS PDSCH release indications corresponding to the enhanced dynamic codebook carried on the PUSCH (a modulo operation is also considered).

A DAI value used by each PDSCH group or a corresponding HARQ-ACK bit may be determined by using an operation 1.

The UL DAI value corresponds to the latest PDSCH group scheduled before the enhanced dynamic codebook is transmitted. A corresponding HARQ-ACK bit may be determined by using the operation 2. Refer to the following descriptions.

The UL DAI value corresponds to a PDSCH group that is prescribed by a protocol and that is configured by using a high-layer parameter, for example, a first group or a second group. A corresponding HARQ-ACK bit may be determined by using the operation 2.

Solution 2: The UL DAI in the DCI format 0_1 is fixedly applied to one PDSCH group, regardless of whether the number of PDSCH groups carried on a PUSCH scheduled in the DCI format 0_1 is greater than 1. One of the following manners may be used:

The UL DAI value corresponds to a PDSCH group that is prescribed by a protocol and that is configured by using a high-layer parameter, for example, a first group or a second group. A corresponding HARQ-ACK bit may be determined by using the operation 2.

The UL DAI value corresponds to the latest PDSCH group scheduled before the enhanced dynamic codebook is transmitted. A corresponding HARQ-ACK bit may be determined by using the operation 2.

Actual operations of Solution 1 and Solution 2 in some cases are completely the same, except that prerequisite assumptions are different. In one solution, the number of PDSCH groups corresponding to the enhanced dynamic codebook is distinguished for separate processing. In the other solution, the number of PDSCH groups is not distinguished.

The following describes the operation 1 and the operation 2.

Operation 1: When the UL DAI in the DCI format 0_1 indicates a sum of DAIs of more than one triggered PDSCH group or indicates the number of dynamic scheduling PDSCH receptions/SPS PDSCH release indications corresponding to the enhanced dynamic codebook, a DAI value used by each PDSCH group or a corresponding HARQ-ACK bit may be determined in the following manner:

Step 1: Take a DAI for each triggered PDSCH group (if the latest downlink scheduling DCI is a DCI format 1_0, the DAI is a C-DAI in the DCI format 1_0; or if the latest downlink scheduling DCI is a DCI format 1_1, the DAI is a T-DAI in the DCI format 1_1), and calculate a relationship between a sum of C-DAIs/T-DAIs of all PDSCH groups (a modulo operation is also considered) and the UL DAI. If the sum is equal to the UL DAI, it is considered that no missed detection of DCI occurs. In this case, perform step 2. Otherwise, it is considered that missed detection of DCI occurs in a PDSCH group. In this case, perform step 3. When the enhanced dynamic codebook corresponds to the N PDSCH groups, if DAIs of all the PDSCH groups are a DAI 1, a DAI 2, . . . , and a DAI N, the calculating a sum DAI_Sum of C-DAIs/T-DAIs of all PDSCH groups (a modulo operation is also considered) may be expressed as follows: DAI_Sum=$(\Sigma N_{i=1}^{N} DAI_i - 1)$mod Round_Size+1. Herein, Round_Size is a modulus of a modulo operation. When a DAI perform indication by using two bits, Round_Size=4.

Step 2: Determine, based on the C-DAI/T-DAI in the latest downlink scheduling DCI format 1_0/1_1 of each triggered PDSCH group, the number and values of HARQ-ACK bit sequences corresponding to the PDSCH group, where an operation procedure (without use of an UL DAI) of constructing a HARQ-ACK codebook transmitted in a PUCCH may be inherited, but the HARQ-ACK-SpatialBundlingPUCCH parameter is replaced with the HARQ-ACK-SpatialBundling-PUSCH parameter.

Step 3: Calculate a DAI difference. If the sum of the C-DAIs/T-DAIs of all the PDSCH groups (a modulo operation is also considered) is DAI_Sum and the UL DAI value in the DCI format 0_1 is UL_DAI, the DAI difference DAI_Diff=(UL_DAI−DAI_Sum−1) mod Round_Size+1. DAI_Diff may be understood as the number of pieces of DCI that is missed in detection. One of the following manners may be used based on different targets to which DAI_Diff is applied.

Manner 1: DAI_Diff is applied to a PDSCH group that is prescribed by a protocol and that is configured by using a high-layer parameter, for example, a first group or a second group.

Manner 2: DAI_Diff is applied to a PDSCH group whose HARQ-ACK bit sequence is placed at the tail of the enhanced dynamic codebook. In this way, at least a HARQ-ACK bit, other than a HARQ-ACK bit at the tail, of a PDSCH group whose HARQ-ACK bit sequence is placed at the head of the enhanced dynamic codebook is not affected by missed detection of DCI.

Manner 3: DAI_Diff is applied to the latest PDSCH group scheduled before the enhanced dynamic codebook is transmitted.

Manner 4: DAI_Diff is not applied to any PDSCH group, but is only used to align a size of a HARQ-ACK codebook between the UE side and the eNB side, to avoid impact on RE demapping and decoding on a UL-SCH.

In Manner 1, Manner 2, and Manner 3, after a PDSCH group to which DAI_Diff is applied is determined and a HARQ-ACK bit sequence of the PDSCH group is determined based on an NR Rel-15 procedure (in this case, when a HARQ-ACK bit sequence of each PDSCH group is determined, only a DAI value indicated in DCI is used, but no UL DAI value is used), DAI_Diff is applied to the tail of the determined HARQ-ACK bit sequence. When DAI_Diff is applied, the following operations may be used:

If the HARQ-ACK-SpatialBundlingPUSCH parameter is not configured for the UE and that one PDSCH reception corresponds to a maximum of two transport blocks is configured for at least one DL BWP of at least one serving cell of the UE by using the maxNrofCodeWordsScheduledByDCI parameter, each absent DAI corresponds to two HARQ-ACK bits. In this case, DAI_Diff×2 bits whose values are '0' are added to the tail of the determined HARQ-ACK bit sequence, and correspond to DAI_Diff×2 NACKs.

Otherwise, each absent DAI corresponds to one HARQ-ACK bit. In this case, DAI_Diff bits whose values are '0' are added to the tail of the determined HARQ-ACK bit sequence, and correspond to DAI_Diff NACKs.

The foregoing DAI_Diff application operations are applicable when CBG-based HARQ transmission is not enabled for any serving cell of the UE.

When some serving cells of the UE are configured with the PDSCH-CodeBlockGroupTransmission parameter, that is, CBG-based HARQ transmission is enabled, a HARQ-ACK codebook of one PDSCH group is obtained by concatenating two HARQ-ACK sub-codebooks, where the $1^{st}$ sub-codebook performs a HARQ-ACK feedback for a TB, and the $2^{nd}$ sub-codebook performs a HARQ-ACK feedback for a CBG. In this case, DAI_Diff is applied to the TB-level sub-codebook according to the foregoing operations. When DAI_Diff is applied to the CBG-level sub-codebook, the following operation may be used:

DAI_Diff×$N_{HARQ\text{-}ACK,max}^{CGB/TB,max}$ bits whose values are '0' are added to the tail of the determined HARQ-ACK bit sequence, and correspond to DAI_Diff×$N_{HARQ\text{-}ACK,max}^{CGB/TB,max}$ NACKs, where $N_{HARQ\text{-}ACK,max}^{CGB/TB,max}$ is a maximum value of $N_{TB,c}^{DL} \cdot N_{HARQ\text{-}ACK,c}^{CGB/TB,max}$ values of $N_{cells}^{DL,CBG}$ serving cells configured with the PDSCH-CodeBlockGroupTransmission parameter, $N_{TB,c}^{DL}$ is a value of a maxNrofCodeWordsScheduledByDCI parameter of a serving cell c, and indicates the maximum number of transport blocks that can be simultaneously scheduled by one piece of DCI, and $N_{HARQ\text{-}ACK,c}^{CGB/TB,max}$ is a value of a maxCodeBlockGroupsPerTransportBlock parameter of a serving cell c, and indicates the maximum number of CBGs into which one transport block can be split.

In Manner 4, a HARQ-ACK bit sequence of each triggered PDSCH group is determined first (in this case, when the HARQ-ACK bit sequence of each PDSCH group is determined, only a DAI value indicated in DCI is used, but no UL DAI value is used). Then a complete HARQ-ACK codebook is determined based on the HARQ-ACK bit sequence of each triggered PDSCH group (for example, the complete HARQ-ACK codebook is obtained by sequentially concatenating HARQ-ACK bit sequences of all triggered PDSCH groups in ascending order of group numbers). Finally, an alignment bit is added to the tail of the HARQ-ACK codebook by using one of the following operations:

When one triggered PDSCH group relates to only a TB-level feedback (to be specific, none of serving cells of the UE is configured with the PDSCH-CodeBlockGroupTransmission parameter to enable CBG-based HARQ transmission), DAI_DiffTB×Bit_Num_Per_DAITB bits whose values are '0' are added to the tail of the HARQ-ACK codebook, and each bit corresponds to one NACK. DAI_DiffTB is DAI_Diff calculated based on the UL DAI in the DCI format 0_1. Bit_Num_Per_DAITB is the number of HARQ-ACK bits corresponding to each DAI. In this case, Bit_Num_Per_DAITB is at a TB granularity.

When one triggered PDSCH group relates to a CBG-level feedback (to be specific, at least one serving cell of the UE is configured with the PDSCH-CodeBlockGroupTransmission parameter to enable CBG-based HARQ transmission), DAI_DiffTB×Bit_Num_Per_DAITB bits whose values are '0' are first added to the tail of the HARQ-ACK codebook, and each bit corresponds to one NACK. DAI_DiffTB is DAI_Diff calculated based on the $1^{st}$ UL DAI (indicated by the "1st downlink assignment index" field) in the DCI format 0_1. Bit_Num_Per_DAITB is the number of HARQ-ACK bits corresponding to each DAI, and is at a TB granularity. Then DAI_DiffCBG×Bit_Num_Per_DAICBG bits whose values are '0' are further added to the tail of the HARQ-ACK codebook, and each bit corresponds to one NACK. DAI_DiffCBG is DAI_Diff calculated based on the $2^{nd}$ UL DAI (indicated by the "2nd downlink assignment index" field) in the DCI format 0_1. Bit_Num_Per_DAICBG is the number of HARQ-ACK bits corresponding to each DAI, and is at a CBG granularity.

Bit_Num_Per_DAITB may be determined in the following manner:

If the HARQ-ACK-SpatialBundlingPUSCH parameter is not configured for the UE and that one PDSCH reception corresponds to a maximum of two transport blocks is configured for at least one DL BWP of at least one serving cell of the UE by using the maxNrofCodeWordsScheduledByDCI parameter, a value of Bit_Num_Per_DAITB is 2. Otherwise, the value of Bit_Num_Per_DAITB is 1.

Bit_Num_Per_DAICBG may be determined in the following manner:

A value of Bit_Num_Per_DAICBG is $N_{HARQ\text{-}ACK,max}^{CGB/TB,max}$. For a meaning of $N_{HARQ\text{-}ACK,max}^{CGB/TB,max}$, refer to the foregoing descriptions.

Operation 2: When the UL DAI value corresponds to one PDSCH group, the operation procedure of constructing a HARQ-ACK codebook when the HARQ-ACK codebook is carried on a PUCCH may be inherited to determine a HARQ-ACK bit sequence corresponding to the PDSCH group.

When a codebook of each triggered PDSCH group corresponds to two sub-codebooks, based on NR Rel-15, the DCI format 0_1 includes two UL DAI values that correspond to the $1^{st}$ sub-codebook and the $2^{nd}$ sub-codebook. The manners included in the foregoing solutions may be used for each sub-codebook.

Figure 4:
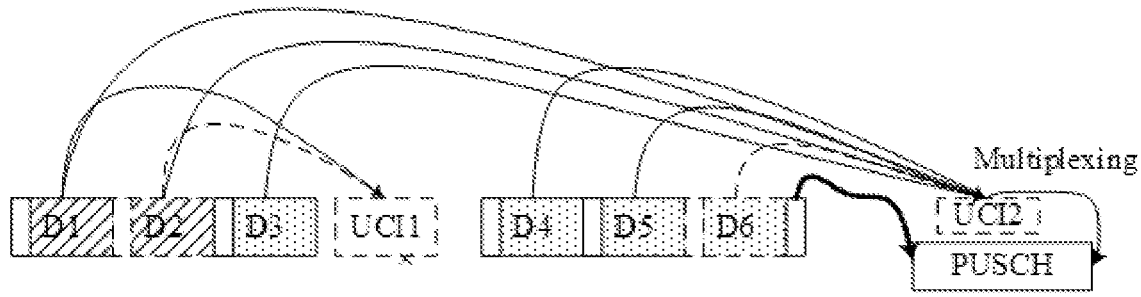
FIG. 4 is a schematic diagram of transmitting a dynamic codebook according to an embodiment of this application.

As shown in FIG. 4, the N PDSCH groups include a PDSCH group 0 and a PDSCH group 1. The PDSCH group 0 includes two PDSCHs: D1 and D2. In addition, the UE detects only D1 but not D2. The PDSCH group 1 includes four PDSCHs: D3, D4, D5, and D6. In addition, the UE detects only D3, D4, and D5 but not D6.

In FIG. 4, transmission of UCI 1 fails. A PUCCH for transmitting UCI 2 overlaps with a PUSCH in time domain, and the UCI 2 is multiplexed onto the PUSCH for transmission. DCI located after D6 is used for scheduling the PUSCH, and the DCI may indicate an UL DAI.

In this embodiment of this application, the terminal may determine, based on the UL DAI, second DAIs corresponding to D1, D2, D3, D4, D5, and D6 respectively, further determine HARQ-ACK sequences of D1, D2, D3, D4, D5, and D6 based on the second DAI, and further generate a dynamic codebook and transmit the dynamic codebook on the PUSCH.

In this embodiment of this application, when a downlink enhanced dynamic codebook is configured for the UE and there is only one UL DAI or one group of UL DAIs in an uplink DCI format 0_1, a corresponding solution is provided for application of the UL DAI, thereby ensuring reliable transmission of a HARQ-ACK codebook, without causing impact on other data transmission carried on the PUSCH.

Figure 5:
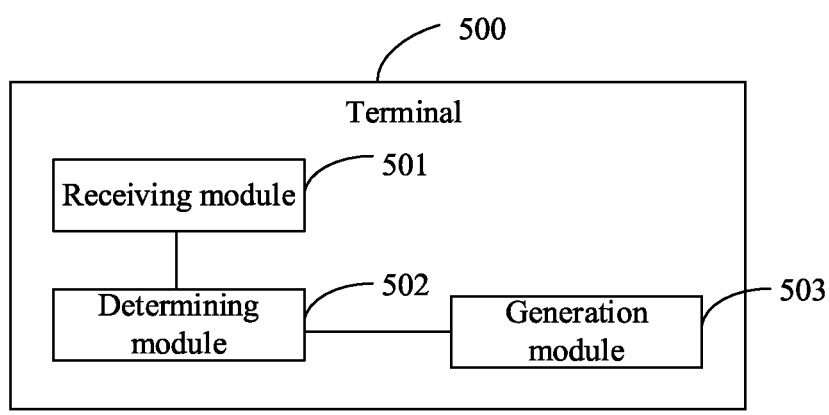
FIG. 5 is a first structural diagram of a terminal according to an embodiment of this application.

FIG. 5 is a first structural diagram of a terminal according to an embodiment of this application. As shown in FIG. 5, the terminal 500 includes:
- a receiving module 501, configured to receive first downlink control information DCI used for scheduling a first physical uplink shared channel PUSCH, where the first DCI includes a first DAI;
- a determining module 502, configured to determine, based on the first DAI, a second DAI corresponding to each of N physical downlink shared channel PDSCH groups; and
- a generation module 503, configured to generate, based on the determined N second DAIs, a dynamic codebook to be transmitted on the first PUSCH, where
- the dynamic codebook includes HARQ-ACK bit sequences of the N PDSCH groups, and N is a positive integer.

Optionally, the determining module includes:
- a first determining submodule, configured to determine a first relationship between the first DAI and the N PDSCH groups; and
- a second determining submodule, configured to determine, based on the first relationship, the second DAI corresponding to each of the N PDSCH groups.

Optionally, the first relationship satisfies that the first DAI corresponds to at least one of the N PDSCH groups.

Optionally, in a case that N is greater than 1, the first relationship satisfies any one of the following:
- a. the first DAI corresponds to the N PDSCH groups; or
  the first DAI corresponds to the first PDSCH group of the N PDSCH groups, where the first PDSCH group satisfies any one of the following:
  the first PDSCH group is a PDSCH group to which a PDSCH scheduled by a target DCI format belongs, where the target DCI format is the last one detected by the terminal and is used for scheduling a PDSCH belonging to any of the N PDSCH groups;
  the first PDSCH group is prescribed by a protocol; or
  the first PDSCH group is configured by a network-side device.

Optionally, in a case that the first DAI corresponds to the first PDSCH group, the second determining submodule is specifically configured to:
- determine the first DAI as the second DAI corresponding to the first PDSCH group; and
- determine a third DAI as the second DAI corresponding to the second PDSCH group, where the third DAI is a DAI in DCI that is last detected by the terminal and that corresponds to the second PDSCH group, and the second PDSCH group is any one of the N PDSCH groups other than the first PDSCH group.

Optionally, in a case that the first DAI corresponds to the N PDSCH groups, the second determining submodule includes:
- an obtaining subunit, configured to obtain a fourth DAI in the second DCI corresponding to each of the N PDSCH groups, where the second DCI corresponding to each PDSCH group is DCI that is last detected by the terminal and that corresponds to the PDSCH group;
- a comparison unit, configured to compare a first value with a value of the first DAI to obtain a corresponding comparison result, where the first value is determined based on a sum of values of the obtained N fourth DAIs; and
- a determining unit, configured to determine, based on the comparison result, the second DAI corresponding to each of the N PDSCH groups.

Optionally, the determining unit includes:
- a first determining subunit, configured to: in a case that the first value is not equal to the value of the first DAI, determine a fifth DAI, where the fifth DAI is used for indicating the number of pieces of DCI that is missed in detection and that is used for scheduling a PDSCH in the N PDSCH groups; and
- a second determining subunit, configured to determine, based on the fifth DAI, the second DAI corresponding to each of the N PDSCH groups.

Optionally, in a case that the terminal has not enabled code block group CBG-based HARQ transmission, the second determining subunit is specifically configured to perform any one of the following operations:
- in a case that the fifth DAI corresponds to the third PDSCH group of the N PDSCH groups, determining, based on the fifth DAI and a sixth DAI, a second DAI corresponding to the third PDSCH group, and determining a seventh DAI as the second DAI corresponding to the fourth PDSCH group; or
- in a case that the fifth DAI does not correspond to any one of the N PDSCH groups, determining a DAI in DCI that is last detected and that corresponds to each of the N PDSCH groups as the second DAI corresponding to the PDSCH group, where the sixth DAI is a DAI in DCI that is last detected by the terminal and that corresponds to the third PDSCH group, the seventh DAI is a DAI in DCI that is last detected by the terminal and that corresponds to the fourth PDSCH group, the third PDSCH group is any one of the N PDSCH groups, and the fourth PDSCH group is any one of the N PDSCH groups other than the third PDSCH group.

Optionally, a HARQ-ACK bit sequence of the third PDSCH group includes a first bit sequence and a second bit sequence that are sequentially concatenated, where
- the first bit sequence is determined based on the sixth DAI, and the second bit sequence is determined based on the fifth DAI.

Optionally, the second bit sequence satisfies any one of the following:
- in a case that a first condition is satisfied, the number of bits included in the second bit sequence is twice a value of the fifth DAI, and bits of the second bit sequence are set to a negative acknowledgement NACK; or
- in a case that a first condition is not satisfied, the number of bits included in the second bit sequence is equal to a value of the fifth DAI, and bits of the second bit sequence are set to a NACK, where the first condition includes: the terminal has enabled spatial HARQ-ACK bundling indication and one PDSCH reception corresponds to a maximum of two transport blocks.

Optionally, in a case that the terminal has enabled code block group CBG-based HARQ transmission, the second determining subunit is specifically configured to perform any one of the following operations:

in a case that the fifth DAI corresponds to the third PDSCH group of the N PDSCH groups, determining, based on a first sub-DAI, a second sub-DAI, a third sub-DAI, and a fourth sub-DAI, the second DAI corresponding to the third PDSCH group, and determining a seventh DAI as the second DAI corresponding to the fourth PDSCH group; or in a case that the fifth DAI does not correspond to any one of the N PDSCH groups, determining a DAI in DCI that is last detected and that corresponds to each of the N PDSCH groups as the second DAI corresponding to the PDSCH group, where the fifth DAI includes the first sub-DAI corresponding to a transport block TB granularity and the second sub-DAI corresponding to a CBG granularity, the third sub-DAI is a DAI in DCI type 1 that is last detected by the terminal and that corresponds to the third PDSCH group, the fourth sub-DAI is a DAI in DCI type 2 that is last detected by the terminal and that corresponds to the third PDSCH group, the seventh DAI is a DAI in DCI that is last detected by the terminal and that corresponds to the fourth PDSCH group, a PDSCH scheduled by the DCI type 1 feeds back a HARQ-ACK based on the TB granularity, a PDSCH scheduled by the DCI type 2 feeds back a HARQ-ACK based on the CBG granularity, the third PDSCH group is any one of the N PDSCH groups, and the fourth PDSCH group is any one of the N PDSCH groups other than the third PDSCH group.

Optionally, a HARQ-ACK bit sequence of the third PDSCH group includes a third bit sequence, a fourth bit sequence, a fifth bit sequence, and a sixth bit sequence that are sequentially concatenated, where the third bit sequence is determined based on the third sub-DAI, the fourth bit sequence is determined based on the first sub-DAI, the fifth bit sequence is determined based on the fourth sub-DAI, and the sixth bit sequence is determined based on the second sub-DAI.

Optionally, the fourth bit sequence satisfies any one of the following:

in a case that a first condition is satisfied, the number of bits included in the fourth sequence is twice a value of the first sub-DAI, and bits of the fourth bit sequence are set to a negative acknowledgement NACK; or in a case that a first condition is not satisfied, the number of bits included in the fourth bit sequence is equal to a value of the first sub-DAI, and bits of the fourth bit sequence are set to a NACK, where the first condition includes: the terminal has enabled spatial HARQ-ACK bundling indication and one PDSCH reception corresponds to a maximum of two transport blocks.

Optionally, the sixth bit sequence satisfies that:

the number of bits included in the sixth bit sequence is equal to a product of a value of the second sub-DAI and a fourth value, and bits of the sixth bit sequence are set to a NACK, where the fourth value is determined based on the maximum number of transport blocks that are schedulable by one piece of DCI and the maximum number of CBGs into which one transport block can be split.

Optionally, the third PDSCH group satisfies any one of the following:

the third PDSCH group is a PDSCH group to which a PDSCH scheduled by a target DCI format belongs, where the target DCI format is the last one detected by the terminal and is used for scheduling a PDSCH belonging to any of the N PDSCH groups;

the third PDSCH group is prescribed by a protocol; or the third PDSCH group is configured by a network-side device.

Optionally, in a case that the fifth DAI does not correspond to any one of the N PDSCH groups, the generation module is specifically configured to:

generate, based on the fifth DAI and the determined N second DAIs, the dynamic codebook to be transmitted on the first PUSCH.

Optionally, the generation module is specifically configured to:

generate a target bit sequence based on the fifth DAI, where the target bit sequence satisfies any one of the following:

in a case that the terminal has not enabled CBG-based HARQ transmission, the number of bits included in the target bit sequence is equal to a product of a value of the fifth DAI and a second value, and bits of the target bit sequence are set to a NACK; or in a case that the terminal has enabled CBG-based HARQ transmission, the fifth DAI includes the third sub-DAI corresponding to a TB granularity and the fourth sub-DAI corresponding to a CBG granularity, the number of bits included in the target bit sequence is equal to a sum of a first target value and a second target value, the first target value is equal to a product of a value of the third sub-DAI and a second value, the second target value is equal to a product of a value of the fourth sub-DAI and a third value, and bits of the target bit sequence are set to a NACK.

Optionally, the second value satisfies any one of the following:

in a case that a first condition is satisfied, a value of the second value is 2; or in a case that a first condition is not satisfied, a value of the second value is 1, where the first condition includes: the terminal has enabled spatial HARQ-ACK bundling indication and one PDSCH reception corresponds to a maximum of two transport blocks.

Optionally, the third value is determined based on the maximum number of transport blocks that are schedulable by one piece of DCI and the maximum number of CBGs into which one transport block can be split.

Optionally, the determining a first relationship between the first DAI and the N PDSCH groups includes:

determining the first relationship between the first DAI and the N PDSCH groups according to a preset rule, where the preset rule includes at least one of the following:

determining, based on a PDSCH group to which a PDSCH scheduled by a target DCI format belongs, a PDSCH group corresponding to the first DAI, where the target DCI format is the last one detected by the terminal and is used for scheduling a PDSCH belonging to any of the N PDSCH groups;

determining, based on a protocol, a PDSCH group corresponding to the first DAI; or determining, based on configuration information of a network-side device, a PDSCH group corresponding to the first DAI.

Optionally, the first relationship satisfies any one of the following:

the first DAI corresponds to the fifth PDSCH group of the N PDSCH groups, where the fifth PDSCH group is any one of the N PDSCH groups; or the first DAI does not correspond to any one of the N PDSCH groups.

Optionally, in a case that the first DAI corresponds to the fifth PDSCH group of the N PDSCH groups, the second determining submodule is specifically configured to:

determine the first DAI as the second DAI corresponding to the fifth PDSCH group; and determine an eighth DAI as the second DAI corresponding to the sixth PDSCH group, where the eighth DAI is a DAI in DCI that is last detected by the terminal and that corresponds to the sixth PDSCH group, and the sixth PDSCH group is any one of the N PDSCH groups other than the fifth PDSCH group.

The terminal 500 can implement the processes that can be implemented by the terminal in the method embodiments of this application, with the same beneficial effects achieved. To avoid repetition, details are not described herein again.

Figure 6:
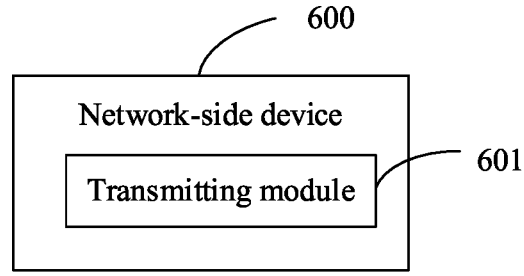
FIG. 6 is a first structural diagram of a network-side device according to an embodiment of this application.

FIG. 6 is a first structural diagram of a network-side device according to an embodiment of this application. As shown in FIG. 6, the network-side device 600 includes:

a transmitting module 601, configured to transmit first downlink control information DCI used for scheduling a first physical uplink shared channel PUSCH, where the first DCI includes a first DAI, and the first DAI is used for generating a dynamic codebook to be transmitted on the first PUSCH, where the dynamic codebook includes HARQ-ACK bit sequences of N physical downlink shared channel PDSCH groups, and N is a positive integer.

Optionally, the first DAI corresponds to at least one of the N PDSCH groups.

Optionally, in a case that N is greater than 1, the first DAI corresponds to the N PDSCH groups, or the first DAI corresponds to the first PDSCH group of the N PDSCH groups.

Optionally, in a case that the first DAI corresponds to the N PDSCH groups, the first DAI is determined based on a sum of values of N ninth DAIs, where each of the N PDSCH groups corresponds to one ninth DAI, each ninth DAI is carried in third DCI corresponding to a PDSCH group that corresponds to the ninth DAI, and the third DCI corresponding to each PDSCH group is DCI that is last transmitted by the network-side device and that corresponds to the PDSCH group.

Optionally, the first DAI does not correspond to any one of the N PDSCH groups.

The network-side device 600 can implement the processes that can be implemented by the network-side device in the method embodiments of this application, with the same beneficial effects achieved. To avoid repetition, details are not described herein again.

Figure 7:
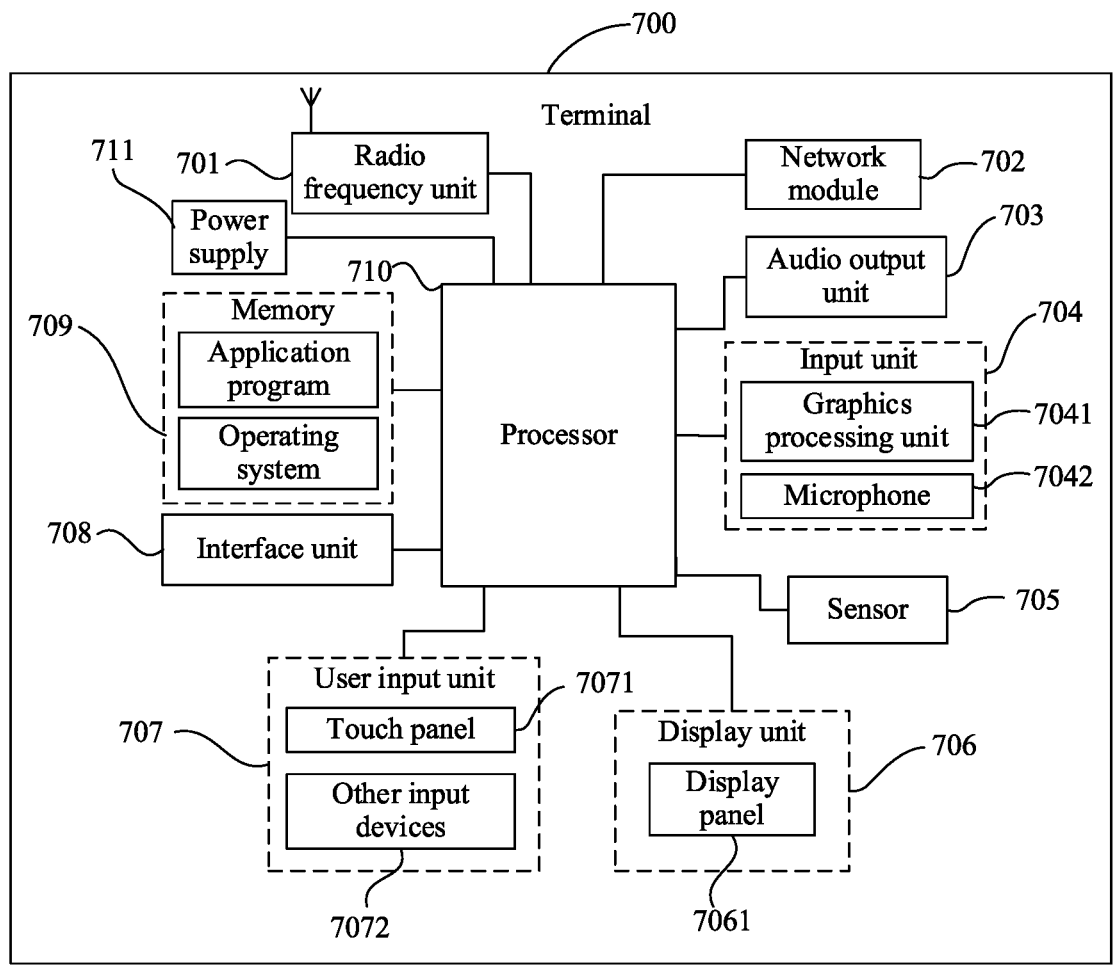
FIG. 7 is a second structural diagram of a terminal according to an embodiment of this application.

FIG. 7 is a second structural diagram of a terminal according to an embodiment of this application. The terminal may be a terminal for implementing the embodiments of this application. As shown in FIG. 7, the terminal 700 includes but is not limited to parts such as a radio frequency unit 701, a network module 702, an audio output unit 703, an input unit 704, a sensor 705, a display unit 706, a user input unit 707, an interface unit 708, a memory 709, a processor 710, and a power supply 711. Persons skilled in the art can understand that the terminal structure shown in FIG. 7 does not constitute a limitation on the terminal. The terminal may include more or fewer components than those shown in the figure, or some components may be combined, or there may be a different component layout. In this embodiment of this application, the terminal includes but is not limited to a mobile phone, a tablet computer, a notebook computer, a palmtop computer, an in-vehicle terminal, a wearable device, a pedometer, and the like.

The radio frequency unit 701 is configured to receive first downlink control information DCI used for scheduling a first physical uplink shared channel PUSCH, where the first DCI includes a first DAI.

The processor 710 is configured to:

determine, based on the first DAI, a second DAI corresponding to each of N physical downlink shared channel PDSCH groups; and generate, based on the determined N second DAIs, a dynamic codebook to be transmitted on the first PUSCH, where the dynamic codebook includes HARQ-ACK bit sequences of the N PDSCH groups, and N is a positive integer.

Optionally, the processor 710 is further configured to:

determine a first relationship between the first DAI and the N PDSCH groups; and determine, based on the first relationship, the second DAI corresponding to each of the N PDSCH groups.

Optionally, the first relationship satisfies that the first DAI corresponds to at least one of the N PDSCH groups.

Optionally, in a case that N is greater than 1, the first relationship satisfies any one of the following:

the first DAI corresponds to the N PDSCH groups; or the first DAI corresponds to the first PDSCH group of the N PDSCH groups, where the first PDSCH group satisfies any one of the following:

the first PDSCH group is a PDSCH group to which a PDSCH scheduled by a target DCI format belongs, where the target DCI format is the last one detected by the terminal and is used for scheduling a PDSCH belonging to any of the N PDSCH groups;

the first PDSCH group is prescribed by a protocol; or the first PDSCH group is configured by a network-side device.

Optionally, in a case that the first DAI corresponds to the first PDSCH group, the processor 710 is further configured to:

determine the first DAI as the second DAI corresponding to the first PDSCH group; and determine a third DAI as the second DAI corresponding to the second PDSCH group, where the third DAI is a DAI in DCI that is last detected by the terminal and that corresponds to the second PDSCH group, and the second PDSCH group is any one of the N PDSCH groups other than the first PDSCH group.

Optionally, in a case that the first DAI corresponds to the N PDSCH groups, the processor 710 is further configured to:

obtain a fourth DAI in the second DCI corresponding to each of the N PDSCH groups, where the second DCI corresponding to each PDSCH group is DCI that is last detected by the terminal and that corresponds to the PDSCH group;

compare a first value with a value of the first DAI to obtain a corresponding comparison result, where the first value is determined based on a sum of values of the obtained N fourth DAIs; and determine, based on the comparison result, the second DAI corresponding to each of the N PDSCH groups.

Optionally, the processor 710 is further configured to:

in a case that the first value is not equal to the value of the first DAI, determine a fifth DAI, where the fifth DAI is used for indicating the number of pieces of DCI that is missed in detection and that is used for scheduling a PDSCH in the N PDSCH groups; and determine, based on the fifth DAI, the second DAI corresponding to each of the N PDSCH groups.

Optionally, in a case that the terminal has not enabled code block group CBG-based HARQ transmission, the processor 710 is further configured to perform any one of the following operations:

in a case that the fifth DAI corresponds to the third PDSCH group of the N PDSCH groups, determining, based on the fifth DAI and a sixth DAI, a second DAI corresponding to the third PDSCH group, and determining a seventh DAI as the second DAI corresponding to the fourth PDSCH group; or in a case that the fifth DAI does not correspond to any one of the N PDSCH groups, determining a DAI in DCI that is last detected and that corresponds to each of the N PDSCH groups as the second DAI corresponding to the PDSCH group, where the sixth DAI is a DAI in DCI that is last detected by the terminal and that corresponds to the third PDSCH group, the seventh DAI is a DAI in DCI that is last detected by the terminal and that corresponds to the fourth PDSCH group, the third PDSCH group is any one of the N PDSCH groups, and the fourth PDSCH group is any one of the N PDSCH groups other than the third PDSCH group.

Optionally, a HARQ-ACK bit sequence of the third PDSCH group includes a first bit sequence and a second bit sequence that are sequentially concatenated, where the first bit sequence is determined based on the sixth DAI, and the second bit sequence is determined based on the fifth DAI.

Optionally, the second bit sequence satisfies any one of the following:

in a case that a first condition is satisfied, the number of bits included in the second bit sequence is twice a value of the fifth DAI, and bits of the second bit sequence are set to a negative acknowledgement NACK; or in a case that a first condition is not satisfied, the number of bits included in the second bit sequence is equal to a value of the fifth DAI, and bits of the second bit sequence are set to a NACK, where the first condition includes: the terminal has enabled spatial HARQ-ACK bundling indication and one PDSCH reception corresponds to a maximum of two transport blocks.

Optionally, in a case that the terminal has enabled code block group CBG-based HARQ transmission, the processor 710 is further configured to perform any one of the following operations:

in a case that the fifth DAI corresponds to the third PDSCH group of the N PDSCH groups, determining, based on a first sub-DAI, a second sub-DAI, a third sub-DAI, and a fourth sub-DAI, the second DAI corresponding to the third PDSCH group, and determining a seventh DAI as the second DAI corresponding to the fourth PDSCH group; or in a case that the fifth DAI does not correspond to any one of the N PDSCH groups, determining a DAI in DCI that is last detected and that corresponds to each of the N PDSCH groups as the second DAI corresponding to the PDSCH group, where the fifth DAI includes the first sub-DAI corresponding to a transport block TB granularity and the second sub-DAI corresponding to a CBG granularity, the third sub-DAI is a DAI in DCI type 1 that is last detected by the terminal and that corresponds to the third PDSCH group, the fourth sub-DAI is a DAI in DCI type 2 that is last detected by the terminal and that corresponds to the third PDSCH group, the seventh DAI is a DAI in DCI that is last detected by the terminal and that corresponds to the fourth PDSCH group, a PDSCH scheduled by the DCI type 1 feeds back a HARQ-ACK based on the TB granularity, a PDSCH scheduled by the DCI type 2 feeds back a HARQ-ACK based on the CBG granularity, the third PDSCH group is any one of the N PDSCH groups, and the fourth PDSCH group is any one of the N PDSCH groups other than the third PDSCH group.

Optionally, a HARQ-ACK bit sequence of the third PDSCH group includes a third bit sequence, a fourth bit sequence, a fifth bit sequence, and a sixth bit sequence that are sequentially concatenated, where the third bit sequence is determined based on the third sub-DAI, the fourth bit sequence is determined based on the first sub-DAI, the fifth bit sequence is determined based on the fourth sub-DAI, and the sixth bit sequence is determined based on the second sub-DAI.

Optionally, the fourth bit sequence satisfies any one of the following:

in a case that a first condition is satisfied, the number of bits included in the fourth sequence is twice a value of the first sub-DAI, and bits of the fourth bit sequence are set to a negative acknowledgement NACK; or in a case that a first condition is not satisfied, the number of bits included in the fourth bit sequence is equal to a value of the first sub-DAI, and bits of the fourth bit sequence are set to a NACK, where the first condition includes: the terminal has enabled spatial HARQ-ACK bundling indication and one PDSCH reception corresponds to a maximum of two transport blocks.

Optionally, the sixth bit sequence satisfies that:

the number of bits included in the sixth bit sequence is equal to a product of a value of the second sub-DAI and a fourth value, and bits of the sixth bit sequence are set to a NACK, where the fourth value is determined based on the maximum number of transport blocks that are schedulable by one piece of DCI and the maximum number of CBGs into which one transport block can be split.

Optionally, the third PDSCH group satisfies any one of the following:

the third PDSCH group is a PDSCH group to which a PDSCH scheduled by a target DCI format belongs, where the target DCI format is the last one detected by the terminal and is used for scheduling a PDSCH belonging to any of the N PDSCH groups;

the third PDSCH group is prescribed by a protocol; or the third PDSCH group is configured by a network-side device.

Optionally, in a case that the fifth DAI does not correspond to any one of the N PDSCH groups, the processor 710 is further configured to:

generate, based on the fifth DAI and the determined N second DAIs, the dynamic codebook to be transmitted on the first PUSCH.

Optionally, the processor 710 is further configured to:

generate a target bit sequence based on the fifth DAI, where the target bit sequence satisfies any one of the following:

in a case that the terminal has not enabled CBG-based HARQ transmission, the number of bits included in the target bit sequence is equal to a product of a value of the fifth DAI and a second value, and bits of the target bit sequence are set to a NACK; or in a case that the terminal has enabled CBG-based HARQ transmission, the fifth DAI includes the third sub-DAI corresponding to a TB granularity and the fourth sub-DAI corresponding to a CBG granularity, the number of bits included in the target bit sequence is equal to a sum of a first target value and a second target value, the first target value is equal to a product of a value of the third sub-DAI and a second value, the second target value is equal to a product of a value of the fourth sub-DAI and a third value, and bits of the target bit sequence are set to a NACK.

Optionally, the second value satisfies any one of the following:

in a case that a first condition is satisfied, a value of the second value is 2; or in a case that a first condition is not satisfied, a value of the second value is 1, where the first condition includes: the terminal has enabled spatial HARQ-ACK bundling indication and one PDSCH reception corresponds to a maximum of two transport blocks.

Optionally, the third value is determined based on the maximum number of transport blocks that are schedulable by one piece of DCI and the maximum number of CBGs into which one transport block can be split.

Optionally, the processor 710 is further configured to:

determine the first relationship between the first DAI and the N PDSCH groups according to a preset rule, where the preset rule includes at least one of the following:

determining, based on a PDSCH group to which a PDSCH scheduled by a target DCI format belongs, a PDSCH group corresponding to the first DAI, where the target DCI format is the last one detected by the terminal and is used for scheduling a PDSCH belonging to any of the N PDSCH groups;

determining, based on a protocol, a PDSCH group corresponding to the first DAI; or determining, based on configuration information of a network-side device, a PDSCH group corresponding to the first DAI.

Optionally, the first relationship satisfies any one of the following:

the first DAI corresponds to the fifth PDSCH group of the N PDSCH groups, where the fifth PDSCH group is any one of the N PDSCH groups; or the first DAI does not correspond to any one of the N PDSCH groups.

Optionally, in a case that the first DAI corresponds to the fifth PDSCH group of the N PDSCH groups, the determining, based on the first relationship, the second DAI corresponding to each of the N PDSCH groups includes:

determining the first DAI as the second DAI corresponding to the fifth PDSCH group; and determining an eighth DAI as the second DAI corresponding to the sixth PDSCH group, where the eighth DAI is a DAI in DCI that is last detected by the terminal and that corresponds to the sixth PDSCH group, and the sixth PDSCH group is any one of the N PDSCH groups other than the fifth PDSCH group.

It should be noted that the terminal 700 in this embodiment can implement the processes of the method embodiments in the embodiments of this application, with the same beneficial effects achieved. To avoid repetition, details are not described herein again.

It should be understood that, in this embodiment of this application, the radio frequency unit 701 may be configured to send or receive a signal in an information transmitting/receiving or call process. Specifically, the radio frequency unit 701 receives downlink data from a base station and sends the downlink data to the processor 710 for processing; and transmits uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may further communicate with a network and another device by using a wireless communications system.

The terminal provides wireless broadband Internet access for a user by using the network module 702, for example, helping the user to send and receive e-mails, to browse web pages, and to access streaming media.

The audio output unit 703 may convert audio data received by the radio frequency unit 701 or the network module 702 or stored in the memory 709 into an audio signal and output the audio signal as a sound. In addition, the audio output unit 703 may further provide audio output (for example, a call signal reception sound or a message reception sound) associated with a specific function performed by the terminal 700. The audio output unit 703 includes a speaker, a buzzer, a receiver, and the like.

The input unit 704 is configured to receive an audio or video signal. The input unit 704 may include a graphics processing unit (GPU) 7041 and a microphone 7042, and the graphics processing unit 7041 processes image data of a still picture or a video obtained by an image capture apparatus (for example, a camera) in an image capture mode or a video capture mode. A processed image frame may be displayed on the display unit 706. The image frame processed by the graphics processing unit 7041 may be stored in the memory 709 (or another storage medium) or transmitted by the radio frequency unit 701 or the network module 702. The microphone 7042 may receive sounds and process such sounds into audio data. The processed audio data may be converted in a telephone call mode into a format that can be transmitted by the radio frequency unit 701 to a mobile communications base station, for outputting.

The terminal 700 further includes at least one sensor 705, for example, an optical sensor, a motion sensor, and another sensor. Specifically, the optical sensor includes an ambient light sensor and a proximity sensor. The ambient light sensor may adjust brightness of a display panel 7061 based on intensity of ambient light. When the terminal 700 moves to an ear, the proximity sensor may turn off the display panel 7061 and/or backlight. As a motion sensor, an accelerometer sensor may detect magnitudes of accelerations in all directions (usually three axes), may detect a magnitude and a direction of gravity when the terminal is still, and may be applied to posture recognition (for example, landscape/ portrait mode switching, a related game, or magnetometer posture calibration) of the terminal, a function associated with vibration recognition (for example, a pedometer or a keystroke), or the like. The sensor 705 may further include a fingerprint sensor, a pressure sensor, an iris sensor, a molecular sensor, a gyroscope, a barometer, a hygrometer, a thermometer, an infrared sensor, or the like. Details are not described herein.

The display unit 706 is configured to display information entered by the user or information provided for the user. The display unit 706 may include the display panel 7061, and the display panel 7061 may be configured in a form of a liquid crystal display (LCD), an organic light-emitting diode (OLED), or the like.

The user input unit 707 may be configured to receive input digit or character information and generate key signal input associated with user setting and function control of the terminal. Specifically, the user input unit 707 includes a touch panel 7071 and other input devices 7072. The touch panel 7071 is also referred to as a touchscreen, and may collect a touch operation of the user on or near the touch panel (for example, an operation performed on or near the touch panel 7071 by the user by using any appropriate object or accessory such as a finger or a stylus). The touch panel 7071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 710, receives a command transmitted by the processor 710, and executes the command. In addition, the touch panel 7071 may be implemented in a plurality of types, for example, a resistive type, a capacitive type, an infrared type, and a surface acoustic wave type. In addition to the touch panel 7071, the user input unit 707 may further include the other input devices 7072. Specifically, the other input devices 7072 may include but are not limited to a physical keyboard, a function key (such as a volume control key or an on/off key), a trackball, a mouse, and a joystick. Details are not described herein.

Further, the touch panel 7071 may cover the display panel 7061. When detecting a touch operation on or near the touch panel 7071, the touch panel 7071 transmits the touch operation to the processor 710 to determine a type of a touch event. Then, the processor 710 provides a corresponding visual output on the display panel 7061 based on the type of the touch event. In FIG. 7, the touch panel 7071 and the display panel 7061 serve as two separate components to implement input and output functions of the terminal. However, in some embodiments, the touch panel 7071 and the display panel 7061 may be integrated to implement the input and output functions of the terminal. This is not specifically limited herein.

The interface unit 708 is an interface for connecting an external apparatus to the terminal 700. For example, the external apparatus may include a wired or wireless headset port, an external power (or battery charger) port, a wired or wireless data port, a memory card port, a port for connecting an apparatus having an identification module, an audio input/output (I/O) port, a video I/O port, an earphone port, and the like. The interface unit 708 may be configured to receive input (for example, data information and electric power) from the external apparatus, and transmit the received input to one or more elements in the terminal 700; or may be configured to transmit data between the terminal 700 and the external apparatus.

The memory 709 may be configured to store software programs and various data. The memory 709 may mainly include a program storage region and a data storage region. The program storage region may store an operating system, an application program required by at least one function (for example, an audio play function or an image play function), and the like. The data storage region may store data (for example, audio data or a phone book) created based on usage of the mobile phone. In addition, the memory 709 may include a high-speed random access memory, or may include a nonvolatile memory, for example, at least one magnetic disk storage device or a flash memory device, or another volatile solid-state storage device.

The processor 710 is a control center of the terminal, connects various parts of the entire terminal by using various interfaces and lines, and performs various functions and data processing of the terminal by running or executing a software program and/or a module stored in the memory 709 and invoking data stored in the memory 709, to perform overall monitoring on the terminal. The processor 710 may include one or more processing units. Optionally, the processor 710 may integrate an application processor and a modem processor. The application processor mainly processes an operating system, a user interface, an application program, and the like. The modem processor mainly processes wireless communication. It can be understood that the modem processor may be alternatively not integrated in the processor 710.

The terminal 700 may further include the power supply 711 (for example, a battery) that supplies power to each component. Optionally, the power supply 711 may be logically connected to the processor 710 by using a power management system, so as to implement functions such as charging management, discharging management, and power consumption management by using the power management system.

In addition, the terminal 700 includes some functional modules that are not shown. Details are not described herein.

Optionally, an embodiment of this application further provides a terminal, including a processor 710, a memory 709, and a computer program that is stored in the memory 709 and capable of running on the processor 710. When the computer program is executed by the processor 710, the processes of the foregoing embodiments of the HARQ-ACK codebook generation method are implemented, with the same technical effects achieved. To avoid repetition, details are not described herein again.

Figure 8:
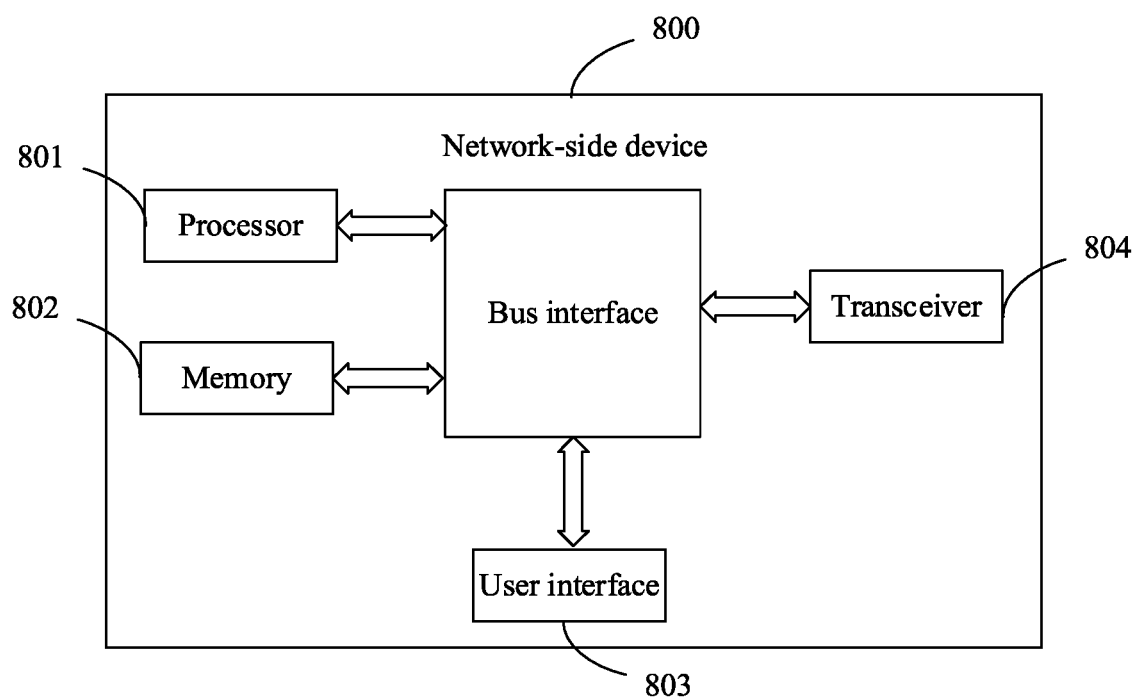
FIG. 8 is a second structural diagram of a network-side device according to an embodiment of this application.

FIG. 8 is a second structural diagram of a network-side device according to an embodiment of this application. As shown in FIG. 8, the network-side device 800 includes a processor 801, a memory 802, a user interface 803, a transceiver 804, and a bus interface.

In this embodiment of this application, the network-side device 800 further includes a computer program stored in the memory 802 and capable of running on the processor 801. When the computer program is executed by the processor 801, the following step is implemented:

transmitting first downlink control information DCI used for scheduling a first physical uplink shared channel PUSCH, where the first DCI includes a first DAI, and the first DAI is used for generating a dynamic codebook to be transmitted on the first PUSCH, where the dynamic codebook includes HARQ-ACK bit sequences of N physical downlink shared channel PDSCH groups, and N is a positive integer.

Optionally, the first DAI corresponds to at least one of the N PDSCH groups.

Optionally, the first DAI corresponds to the N PDSCH groups, or the first DAI corresponds to the first PDSCH group of the N PDSCH groups.

Optionally, in a case that the first DAI corresponds to the N PDSCH groups, the first DAI is determined based on a sum of values of N ninth DAIs, where each of the N PDSCH groups corresponds to one ninth DAI, each ninth DAI is carried in third DCI corresponding to a PDSCH group that corresponds to the ninth DAI, and the third DCI corresponding to each PDSCH group is DCI that is last transmitted by the network-side device and that corresponds to the PDSCH group. Optionally, the first DAI does not correspond to any one of the N PDSCH groups.

In FIG. 8, a bus architecture may include any quantity of interconnected buses and bridges, and specifically connect together various circuits of one or more processors represented by the processor 801 and a memory represented by the memory 802. The bus architecture may further interconnect various other circuits such as a peripheral device, a voltage regulator, and a power management circuit. These are all well known in the art, and therefore are not further described in this specification. The bus interface provides an interface. The transceiver 804 may be a plurality of components, including a transmitter and a receiver, and provides units for communicating with a variety of other apparatuses on a transmission medium. For different user equipments, the user interface 803 may also be an interface capable of externally or internally connecting a required device, and the connected device includes but is not limited to a keypad, a display, a speaker, a microphone, a joystick, and the like.

The processor 801 is responsible for management of the bus architecture and general processing, and the memory 802 may store data for use by the processor 801 when the processor 801 performs an operation.

Optionally, when the computer program is executed by the processor 801, the following step may be further implemented:

The network-side device 800 can implement the processes implemented by the network-side device in the foregoing method embodiments. To avoid repetition, details are not described herein again.

An embodiment of this application further provides a computer-readable storage medium. The computer-readable storage medium stores a computer program. When the computer program is executed by a processor, the processes of the foregoing embodiments of the HARQ-ACK codebook generation method or the foregoing embodiments of the information transmitting method are implemented, with the same technical effects achieved. To avoid repetition, details are not described herein again. For example, the computer-readable storage medium is a read-only memory (ROM), a random access memory (RAM), a magnetic disk, an optical disk, or the like.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. Without more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may be alternatively implemented by using hardware. However, in most cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in each embodiment of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A hybrid automatic repeat request acknowledgement (HARQ-ACK) codebook generation method, applied to a terminal, wherein the method comprises:

receiving first downlink control information (DCI) used for scheduling a first physical uplink shared channel (PUSCH), wherein the first DCI comprises a first downlink assignment index (DAI);

determining, based on the first DAI, a second DAI corresponding to each of N physical downlink shared channel (PDSCH) groups; and generating, based on the determined N second DAIs, a dynamic codebook to be transmitted on the first PUSCH, wherein the dynamic codebook comprises HARQ-ACK bit sequences of the N PDSCH groups, and N is a positive integer.

2. The method according to claim 1, wherein the determining, based on the first DAI, a second DAI corresponding to each of N physical downlink shared channel PDSCH groups comprises:

determining a first relationship between the first DAI and the N PDSCH groups; and determining, based on the first relationship, the second DAI corresponding to each of the N PDSCH groups.

3. The method according to claim 2, wherein the first relationship satisfies that the first DAI corresponds to at least one of the N PDSCH groups.

4. The method according to claim 3, wherein in a case that N is equal to 1, the first relationship satisfies that a value of the first DAI corresponds to one triggered PDSCH group.

5. The method according to claim 3, wherein in a case that N is greater than 1, the first relationship satisfies any one of the following:

the first DAI corresponds to the N PDSCH groups; or the first DAI corresponds to the first PDSCH group of the N PDSCH groups, wherein the first PDSCH group satisfies any one of the following:

the first PDSCH group is a PDSCH group to which a PDSCH scheduled by a target DCI format belongs, wherein the target DCI format is the last one detected by the terminal and is used for scheduling a PDSCH belonging to any of the N PDSCH groups;
the first PDSCH group is prescribed by a protocol; or
the first PDSCH group is configured by a network-side device.

6. The method according to claim 5, wherein in a case that the first DAI corresponds to the first PDSCH group, the determining, based on the first relationship, the second DAI corresponding to each of the N PDSCH groups comprises:
determining the first DAI as the second DAI corresponding to the first PDSCH group; and
determining a third DAI as the second DAI corresponding to the second PDSCH group, wherein
the third DAI is a DAI in DCI that is last detected by the terminal and that corresponds to the second PDSCH group, and the second PDSCH group is any one of the N PDSCH groups other than the first PDSCH group.

7. The method according to claim 5, wherein in a case that the first DAI corresponds to the N PDSCH groups, the determining, based on the first relationship, the second DAI corresponding to each of the N PDSCH groups comprises:
obtaining a fourth DAI in the second DCI corresponding to each of the N PDSCH groups, wherein the second DCI corresponding to each PDSCH group is DCI that is last detected by the terminal and that corresponds to the PDSCH group;
comparing a first value with a value of the first DAI to obtain a corresponding comparison result, wherein the first value is determined based on a sum of values of the obtained N fourth DAIs; and
determining, based on the comparison result, the second DAI corresponding to each of the N PDSCH groups.

8. The method according to claim 7, wherein the determining, based on the comparison result, the second DAI corresponding to each of the N PDSCH groups comprises:
in a case that the first value is not equal to the value of the first DAI, determining a fifth DAI, wherein the fifth DAI is used for indicating the number of pieces of DCI that is missed in detection and that is used for scheduling a PDSCH in the N PDSCH groups; and
determining, based on the fifth DAI, the second DAI corresponding to each of the N PDSCH groups.

9. The method according to claim 2, wherein the determining a first relationship between the first DAI and the N PDSCH groups comprises:
determining the first relationship between the first DAI and the N PDSCH groups according to a preset rule, wherein
the preset rule comprises at least one of the following:
determining, based on a PDSCH group to which a PDSCH scheduled by a target DCI format belongs, a PDSCH group corresponding to the first DAI, wherein the target DCI format is the last one detected by the terminal and is used for scheduling a PDSCH belonging to any of the N PDSCH groups;
determining, based on a protocol, a PDSCH group corresponding to the first DAI; or
determining, based on configuration information of a network-side device, a PDSCH group corresponding to the first DAI.

10. The method according to claim 9, wherein the first relationship satisfies any one of the following:
the first DAI corresponds to the fifth PDSCH group of the N PDSCH groups, wherein the fifth PDSCH group is any one of the N PDSCH groups; or
the first DAI does not correspond to any one of the N PDSCH groups.

11. The method according to claim 10, wherein in a case that the first DAI corresponds to the fifth PDSCH group of the N PDSCH groups, the determining, based on the first relationship, the second DAI corresponding to each of the N PDSCH groups comprises:
determining the first DAI as the second DAI corresponding to the fifth PDSCH group; and
determining an eighth DAI as the second DAI corresponding to the sixth PDSCH group, wherein
the eighth DAI is a DAI in DCI that is last detected by the terminal and that corresponds to the sixth PDSCH group, and the sixth PDSCH group is any one of the N PDSCH groups other than the fifth PDSCH group.

12. An information transmitting method, applied to a network-side device, wherein the method comprises:
transmitting first downlink control information (DCI) used for scheduling a first physical uplink shared channel (PUSCH), wherein the first DCI comprises a first downlink assignment index (DAI), and the first DAI is used for generating a dynamic codebook to be transmitted on the first PUSCH, wherein the first DAI is used to determine a second DAI corresponding to each of N physical downlink shared channel (PDSCH) groups, and the determined N second DAIs are used to generate the dynamic codebook to be transmitted on the first PUSCH; and
wherein the dynamic codebook comprises hybrid automatic repeat request acknowledgement (HARQ-ACK) bit sequences of N physical downlink shared channel PDSCH groups, and N is a positive integer.

13. The method according to claim 12, wherein the first DAI corresponds to at least one of the N PDSCH groups.

14. The method according to claim 13, wherein in a case that N is greater than 1, a value of the first DAI corresponds to one triggered PDSCH group.

15. The method according to claim 13, wherein in a case that N is greater than 1, the first DAI corresponds to the N PDSCH groups, or the first DAI corresponds to the first PDSCH group of the N PDSCH groups, and the first PDSCH group is any one of the N PDSCH groups.

16. The method according to claim 15, wherein in a case that the first DAI corresponds to the N PDSCH groups, the first DAI is determined based on a sum of values of N ninth DAIs, wherein
each of the N PDSCH groups corresponds to one ninth DAI, each ninth DAI is carried in third DCI corresponding to a PDSCH group that corresponds to the ninth DAI, and the third DCI corresponding to each PDSCH group is DCI that is last transmitted by the network-side device and that corresponds to the PDSCH group.

17. A terminal, comprising a processor, a memory, and a computer program stored in the memory and capable of running on the processor, wherein when the computer program is executed by the processor, the following steps are implemented:
receiving first downlink control information (DCI) used for scheduling a first physical uplink shared channel (PUSCH), wherein the first DCI comprises a first downlink assignment index (DAI);
determining, based on the first DAI, a second DAI corresponding to each of N physical downlink shared channel (PDSCH) groups; and
generating, based on the determined N second DAIs, a dynamic codebook to be transmitted on the first PUSCH, wherein the dynamic codebook comprises hybrid automatic repeat request acknowledgement (HARQ-ACK) bit sequences of the N PDSCH groups, and N is a positive integer.

18. The terminal according to claim 17, wherein when the computer program is executed by the processor, the following steps are further implemented:
   determining a first relationship between the first DAI and the N PDSCH groups; and
   determining, based on the first relationship, the second DAI corresponding to each of the N PDSCH groups.

19. The terminal according to claim 18, wherein the first relationship satisfies that the first DAI corresponds to at least one of the N PDSCH groups.

20. A non-transitory computer-readable storage medium, wherein the computer-readable storage medium stores a computer program, and when the computer program is executed by a processor, the steps of the HARQ-ACK codebook generation method according to claim 1 are implemented.

* * * * *